United States Patent
Jenkins et al.

(10) Patent No.: US 12,551,294 B2
(45) Date of Patent: Feb. 17, 2026

(54) INTRALUMINAL TREATMENT GUIDANCE PRIOR EXTRALUMINAL IMAGING, INTRALUMINAL DATA, AND COREGISTRATION

(71) Applicants: KONINKLIJKE PHILIPS N.V., Eindhoven (NL); PHILIPS IMAGE GUIDED THERAPY CORPORATION, San Diego, CA (US)

(72) Inventors: Rebecca Ann Jenkins, San Diego, CA (US); Ryan Michael Sotak, Colorado Springs, CO (US); Ehud Nachtomy, Herzliya (IL); Emily Brown, Amsterdam (NL); Ronald Helmstrijd, Best (NL)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 162 days.

(21) Appl. No.: 18/290,326

(22) PCT Filed: Apr. 22, 2022

(86) PCT No.: PCT/EP2022/060728
§ 371 (c)(1),
(2) Date: Nov. 13, 2023

(87) PCT Pub. No.: WO2022/238092
PCT Pub. Date: Nov. 17, 2022

(65) Prior Publication Data
US 2024/0245465 A1    Jul. 25, 2024

Related U.S. Application Data
(60) Provisional application No. 63/187,961, filed on May 13, 2021.

(51) Int. Cl.
| | |
|---|---|
| A61B 34/00 | (2016.01) |
| A61B 6/00 | (2006.01) |
| A61B 6/12 | (2006.01) |
| A61B 6/46 | (2024.01) |
| A61B 34/20 | (2016.01) |
| A61B 90/00 | (2016.01) |

(52) U.S. Cl.
CPC .............. *A61B 34/20* (2016.02); *A61B 6/12* (2013.01); *A61B 6/463* (2013.01); *A61B 6/5247* (2013.01);
(Continued)

(58) Field of Classification Search
CPC ...................................................... A61B 34/20
See application file for complete search history.

(56) References Cited

U.S. PATENT DOCUMENTS

| | | |
|---|---|---|
| 6,776,763 B2 | 8/2004 | Nix |
| 7,226,417 B1 | 6/2007 | Eberle |

(Continued)

FOREIGN PATENT DOCUMENTS

| | | |
|---|---|---|
| WO | 2020159984 A1 | 8/2020 |
| WO | 2022161790 A1 | 8/2022 |

(Continued)

OTHER PUBLICATIONS

International Search Report and Written Opinion of PCT/EP2022/060728, dated Jun. 22, 2022.

*Primary Examiner* — Joseph M Santos Rodriguez

(57) ABSTRACT

A co-registration system includes a processor circuit that displays one or more intravascular images corresponding to locations along a blood vessel and associated bookmarks within a corresponding x-ray image. The processor circuit receives, from an x-ray imaging device, x-ray images while an intravascular catheter moves through the blood vessel.

(Continued)

The processor circuit receives, from the catheter, intravascular data representative of the blood vessel. The processor circuit co-registers the intravascular data to an x-ray image received from the x-ray imaging device. During an imaging phase, the processor circuit generates and displays, based on the coregistered data, bookmarks along the blood vessel. During a later treatment phase, the bookmarks are also displayed in different x-ray images, along with one or more intravascular image corresponding to locations along the blood vessel at which a treatment device is positioned.

15 Claims, 14 Drawing Sheets

(52) U.S. Cl.
CPC ...... *A61B 90/39* (2016.02); *A61B 2034/2063* (2016.02); *A61B 2090/3966* (2016.02)

(56) References Cited

U.S. PATENT DOCUMENTS

| | | |
|---|---|---|
| 7,846,101 B2 | 12/2010 | Eberle |
| 7,930,014 B2 | 4/2011 | Huennekens |
| 8,290,228 B2 | 10/2012 | Cohen |
| 8,463,007 B2 | 6/2013 | Steinberg |
| 8,670,603 B2 | 3/2014 | Tolkowsky |
| 8,693,756 B2 | 4/2014 | Tolkowsky |
| 8,781,193 B2 | 7/2014 | Steinberg |
| 8,855,744 B2 | 10/2014 | Tolkowsky |
| 10,076,301 B2 | 9/2018 | Millett |
| 2006/0241465 A1 | 10/2006 | Huennekens |
| 2015/0305710 A1 | 10/2015 | Stigall |
| 2017/0065206 A1 | 3/2017 | Bozkaya |
| 2020/0069264 A1 | 3/2020 | Merritt |
| 2020/0129142 A1 | 4/2020 | Chao |
| 2020/0129143 A1 | 4/2020 | Di Tullio |
| 2020/0129144 A1 | 4/2020 | Rajguru |
| 2020/0129147 A1 | 4/2020 | Nair |
| 2020/0129148 A1 | 4/2020 | Jenkins |
| 2020/0129158 A1 | 4/2020 | Chao |
| 2020/0129159 A1 | 4/2020 | Rajguru |
| 2020/0375576 A1 | 12/2020 | Moulton |

FOREIGN PATENT DOCUMENTS

| | | |
|---|---|---|
| WO | 2022238058 A1 | 11/2022 |
| WO | 2022238229 A1 | 11/2022 |
| WO | 2022238276 A1 | 11/2022 |
| WO | 2022238392 A1 | 11/2022 |

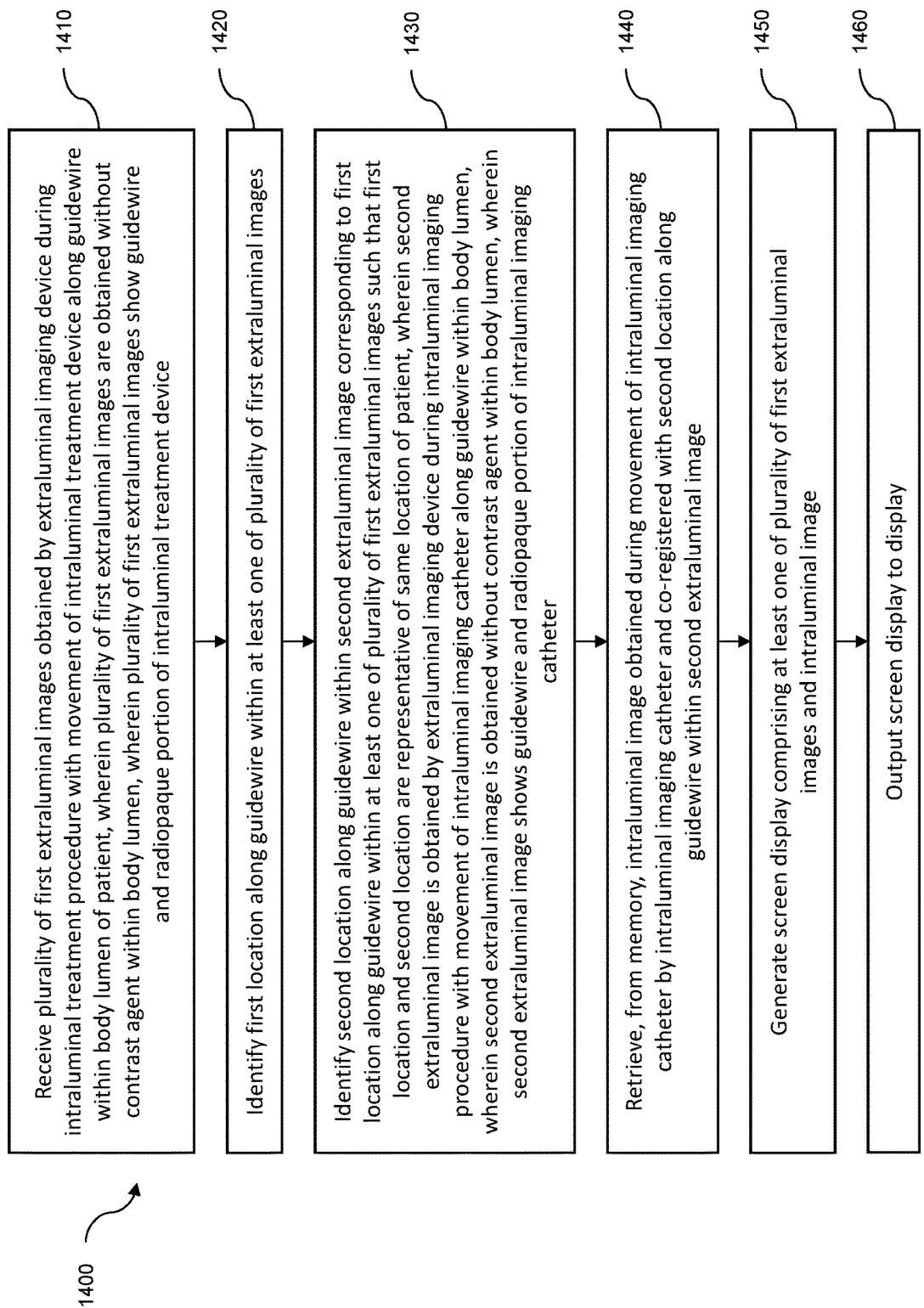

ated during the imaging phase, stored, and then retrieved and display during the treatment phase. This advantageously provides a physician with additional guidance during the treatment phase. The physician is able to know exactly where a treatment device, such as a stent, is positioned relative to the target location identified during imaging, which helps the physician place the treatment device as close as possible to the desired target location. The physician is also able to see the location of the treatment device relative to other previously marked locations, such as areas of occlusions or lesions, or surrounding structures. The physician is also able to quickly view IVUS images of any location along the vessel being treated, including IVUS images of the current location of the treatment device. This provides intravascular image guidance during treatment even though no IVUS imaging catheter is present during treatment and treatment device do not have IVUS imaging.

INTRALUMINAL TREATMENT GUIDANCE PRIOR EXTRALUMINAL IMAGING, INTRALUMINAL DATA, AND COREGISTRATION

TECHNICAL FIELD

The present disclosure relates generally to providing therapeutic guidance during an intraluminal treatment procedure using data from an earlier procedural stage with extraluminal (e.g., x-ray) imaging, intraluminal data (e.g., intravascular ultrasound or IVUS imaging), and coregistration between the extraluminal imaging and intraluminal data. For example, markers on an x-ray image and co-registered IVUS images are generated and stored during the prior intravascular procedure, and then recalled and displayed on a contemporaneous x-ray image during the intravascular treatment procedure.

BACKGROUND

Physicians use many different medical diagnostic systems and tools to monitor a patient's health and diagnose and treat medical conditions. Different modalities of medical diagnostic systems may provide a physician with different images, models, and/or data relating to internal structures within a patient. These modalities include invasive devices and systems, such as intravascular systems, and non-invasive devices and systems, such as external ultrasound systems or x-ray systems. Using multiple diagnostic systems to examine a patient's anatomy provides a physician with added insight into the condition of the patient.

In the field of intravascular imaging and physiology measurement, co-registration of data from invasive devices (e.g. intravascular ultrasound (IVUS) devices) with images collected non-invasively (e.g. via x-ray angiography and/or x-ray venography) is a powerful technique for improving the efficiency and accuracy of vascular catheterization procedures. Co-registration identifies the locations of intravascular data measurements along a blood vessel by mapping the data to an x-ray image of the vessel. A physician may then see on an angiography or venography image exactly where along the vessel a measurement was made, rather than estimate the location.

A catheterization laboratory procedure can include imaging and treatment. During imaging, the physician identifies areas of a blood vessel that need treatment. The physician may identify locations along the vessel where treatment devices or procedures should be deployed to remedy any physiological conditions of the blood vessel. For peripheral venous (or arterial) procedures, the physician may mark these locations during the imaging. It is often difficult to transfer marks from imaging to treatment. The physician may be required to make physical marks with a grease pencil on the display screen during the imaging to preserve the marks for treatment. However, this method is time consuming and prone to error. For other procedures, such as coronary angiography procedures, making physical marks with a grease pencil on the display screen may not be a viable method at all, because of vessel motion. In most procedures, any intravascular imaging device used during the imaging phase is typically removed before treatment, which leaves the physician with no intravascular view of the vessel during treatment.

SUMMARY

Embodiments of the present disclosure are systems, devices, and methods for generating and storing markers during an imaging phase of a cath lab procedure and transferring those markers created to a treatment phase of the cath lab procedure. Additionally, IVUS images are generated and coregistered during the imaging phase, stored, and then retrieved and display during the treatment phase. This advantageously provides a physician with additional guidance during the treatment phase. The physician is able to know exactly where a treatment device, such as a stent, is positioned relative to the target location identified during imaging, which helps the physician place the treatment device as close as possible to the desired target location. The physician is also able to see the location of the treatment device relative to other previously marked locations, such as areas of occlusions or lesions, or surrounding structures. The physician is also able to quickly view IVUS images of any location along the vessel being treated, including IVUS images of the current location of the treatment device. This provides intravascular image guidance during treatment even though no IVUS imaging catheter is present during treatment and treatment device do not have IVUS imaging.

In one aspect, the imaging system may display an x-ray image with coregistered intravascular ultrasound (IVUS) images to the physician during an imaging phase. The system allows the physician to create markers within the displayed x-ray image. The physician may choose to mark areas along a blood vessel of an occlusion, a lesion, or landing zones for a treatment device, like a stent. The system then saves the markers and their locations relative to a guidewire shown in the x-ray image or the x-ray image itself. During the subsequent treatment phase, the system displays the same markers overlaid over the same vessel in the contemporaneous x-ray image showing the treatment device as it is inserted and positioned in the vessel.

In another aspect, during the treatment phase, the physician sees one or more IVUS images from the earlier imaging phase. For example, the one or more images can include an IVUS image at the location of the distal end of the treatment device and IVUS image at the location of the proximal end of the treatment device. As the treatment device moves through the vessel, these IVUS images can be continuously updated in real time to show the previously acquired IVUS image at the current position of the treatment device.

In another aspect, during the treatment phase, the physician may select a location along a guidewire positioned in the vessel in the x-ray image to see the IVUS image at the selected location. In that regard, the guidewire can be positioned within the vessel at the same position and orientation within the vessel during both imaging and treatment. For example, the IVUS imaging catheter and the treatment catheter can move along the guidewire respectively during imaging and treatment. The IVUS images during the imaging phase can be coregistered to locations along the guidewire. As the treatment device is positioned in a vessel, the physician may wish to verify that the intravascular structure at a particular region of the vessel. The physician may select this region along the guidewire in the contemporaneous x-ray image to view the previously acquired IVUS image at the location to ensure that the treatment device is positioned properly.

In an exemplary aspect, a system is provided. The system comprises a processor configured for communication with an extraluminal imaging device, a memory, and a display, wherein the processor is configured to retrieve, from the memory, a marker associated with a first location within a first extraluminal image obtained by the extraluminal imaging device during an intraluminal imaging procedure with movement of an intraluminal imaging catheter along a guidewire within a body lumen, wherein the first extraluminal image is obtained without contrast agent within the body lumen of a patient, wherein the first extraluminal image shows the guidewire and a radiopaque portion of the intraluminal imaging catheter; receive a plurality of second extraluminal images obtained by the extraluminal imaging device during an intraluminal treatment procedure with movement of an intraluminal treatment device along the guidewire within the body lumen, wherein the plurality of second extraluminal images are obtained without the contrast agent within the body lumen, wherein the plurality of second extraluminal images show the guidewire and a radiopaque portion of the intraluminal treatment device; identify a second location within the plurality of second extraluminal images corresponding to the first location within the first extraluminal image; generate a screen display comprising the plurality of second extraluminal images; and the marker at the second location within the plurality of second extraluminal images; and output the screen display to the display.

In one aspect, the marker is representative of at least one of a bookmarked IVUS image, a treatment region, or an anatomical feature. In one aspect, the marker is user-generated. In one aspect, the marker is a shape drawn by a user. In one aspect, the marker is automatically generated by the processor circuit. In one aspect, the patient, the guidewire, and the x-ray imaging device are in a same arrangement in the intraluminal imaging procedure and the intravascular treatment procedure. In one aspect, the first location and the second location are representative of a same location of the patient.

In an exemplary aspect, a system is provided. The system comprises a processor configured for communication with an x-ray imaging device, a memory, and a display, wherein the processor is configured to retrieve, from the memory, a marker associated with a first location within a first x-ray image obtained by the x-ray imaging device during an intravascular ultrasound (IVUS) imaging procedure with movement of an IVUS imaging catheter along a guidewire within a blood vessel of a patient, wherein the first x-ray image is obtained without contrast agent within the blood vessel, wherein the first x-ray image shows the guidewire and a radiopaque portion of the IVUS imaging catheter, wherein the marker is representative of at least one of a bookmarked IVUS image, a treatment region, or an anatomical feature; receive a plurality of second x-ray images obtained by the x-ray imaging device during an intravascular treatment procedure with movement of an intravascular treatment device along the guidewire within the blood vessel, wherein the plurality of second x-ray images are obtained without the contrast agent within the blood vessel, wherein the plurality of second x-ray images show the guidewire and a radiopaque portion of the intravascular treatment device, wherein the patient, the guidewire, and the x-ray imaging device are in a same arrangement in IVUS imaging procedure and the intravascular treatment procedure; identify a second location within the plurality of second x-ray images corresponding to the first location within the first x-ray image such that the first location and the second location are representative of a same location of the patient; generate a screen display comprising the plurality of second x-ray images; and the marker at the second location within the plurality of second x-ray images; and output the screen display to the display.

In an exemplary aspect, a system is provided. The system comprises a processor configured for communication with an extraluminal imaging device, a memory, and a display, wherein the processor is configured to receive a plurality of first extraluminal images obtained by the extraluminal imaging device during an intraluminal treatment procedure with movement of an intraluminal treatment device along a guidewire within a body lumen of a patient, wherein the plurality of first extraluminal images are obtained without the contrast agent within the body lumen, wherein the plurality of first extraluminal images show the guidewire and a radiopaque portion of the intraluminal treatment device; identify a first location along the guidewire within at least one of the plurality of first extraluminal images; identify a second location along the guidewire within a second extraluminal image corresponding to the first location along the guidewire within at least one of the plurality of first extraluminal images such that the first location and the second location are representative of a same location of the patient, wherein the second extraluminal image is obtained by the extraluminal imaging device during an intraluminal imaging procedure with movement of an intraluminal imaging catheter along the guidewire within the body lumen, wherein the second extraluminal image is obtained without contrast agent within the body lumen, wherein the second extraluminal image shows the guidewire and a radiopaque portion of the intraluminal imaging catheter; retrieve, from the memory, an intraluminal image obtained during the movement of the intraluminal imaging catheter and co-registered with the second location along the guidewire within the second extraluminal image; generate a screen display comprising at least one of the plurality of first extraluminal images; and the intraluminal image; and output the screen display to the display.

In one aspect, to identify the first location along the guidewire, the processor is configured to identify a radiopaque marker of the intraluminal treatment device. In one aspect, the processor is configured to identify a further radiopaque marker of the intraluminal treatment device at a further first location along the guidewire in at least one of the plurality of first extraluminal images, wherein the radiopaque marker and the further radiopaque marker are respectively disposed at a proximal portion and a distal portion of the intraluminal treatment device. In one aspect, the processor is configured to identify a further second location along the guidewire within the second x-ray image corresponding to the further first location along the guidewire within at least one of the plurality of first extraluminal images such that the further first location and the further second location are representative of a same location of the patient; and retrieve, from the memory, a further intraluminal image obtained during the movement of the intraluminal imaging catheter and co-registered with the further second location along the guidewire within the second extraluminal image, wherein the screen display comprises the further intraluminal image simultaneously displayed with the intraluminal image and the at least one of the plurality of first extraluminal images. In one aspect, the processor is configured to automatically track the radiopaque marker within the plurality of first extraluminal images; identify a different location along the guidewire for the radiopaque marker in at least one of the plurality of first extraluminal images; identify a further location along the guidewire within the second x-ray image corresponding to the different location along the guidewire within at least one of the plurality of first extraluminal images such that the different location and the further location are representative of the same location of the patient; retrieve, from the memory, a further intraluminal image obtained during the movement of the intraluminal imaging catheter and coregistered with the further location along the guidewire within the second extraluminal image; and modify the screen display to remove the intraluminal image and add the further intraluminal image. In one aspect, to identify the first location along the guidewire, the processor is configured to receive a user input selecting the first location.

In an exemplary aspect, a system is provided. The system comprises a processor configured for communication with an x-ray imaging device, a memory, and a display, wherein the processor is configured to receive a plurality of first x-ray images obtained by the x-ray imaging device during an intravascular treatment procedure with movement of an intravascular treatment device along a guidewire within a blood vessel of a patient, wherein the plurality of first x-ray images are obtained without the contrast agent within the body lumen, wherein the plurality of first x-ray images show the guidewire and a radiopaque portion of the intravascular treatment device; identify one or more first locations along the guidewire within at least one of the plurality of first x-ray images, wherein the one or more first locations are associated with one or more radiopaque markers of the intravascular treatment device and/or a user-selected location; identify one or more second locations along the guidewire within a second x-ray image corresponding to the one or more first locations along the guidewire within at least one of the plurality of first x-ray images such that the one or more first locations and the one or more second locations are representative of one or more same locations of the patient, wherein the second x-ray image is obtained by the x-ray imaging device during an intravascular ultrasound (IVUS) imaging procedure with movement of an IVUS imaging catheter along the guidewire within the body lumen, wherein the second x-ray image is obtained without contrast agent within the body lumen, wherein the second x-ray image shows the guidewire and a radiopaque portion of the IVUS imaging catheter; retrieve, from the memory, one or more IVUS images obtained during the movement of the by IVUS imaging catheter and co-registered with the one or more second locations along the guidewire within the second x-ray image; generate a screen display comprising at least one of the plurality of first x-ray images; and the one or more IVUS images; and output the screen display to the display.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which:

FIG. 14 is a flow diagram for a method for intraluminal treatment guidance based on prior extraluminal imaging, intraluminal data, and coregistration, according to aspects of the present disclosure.

DETAILED DESCRIPTION

Figure 1:
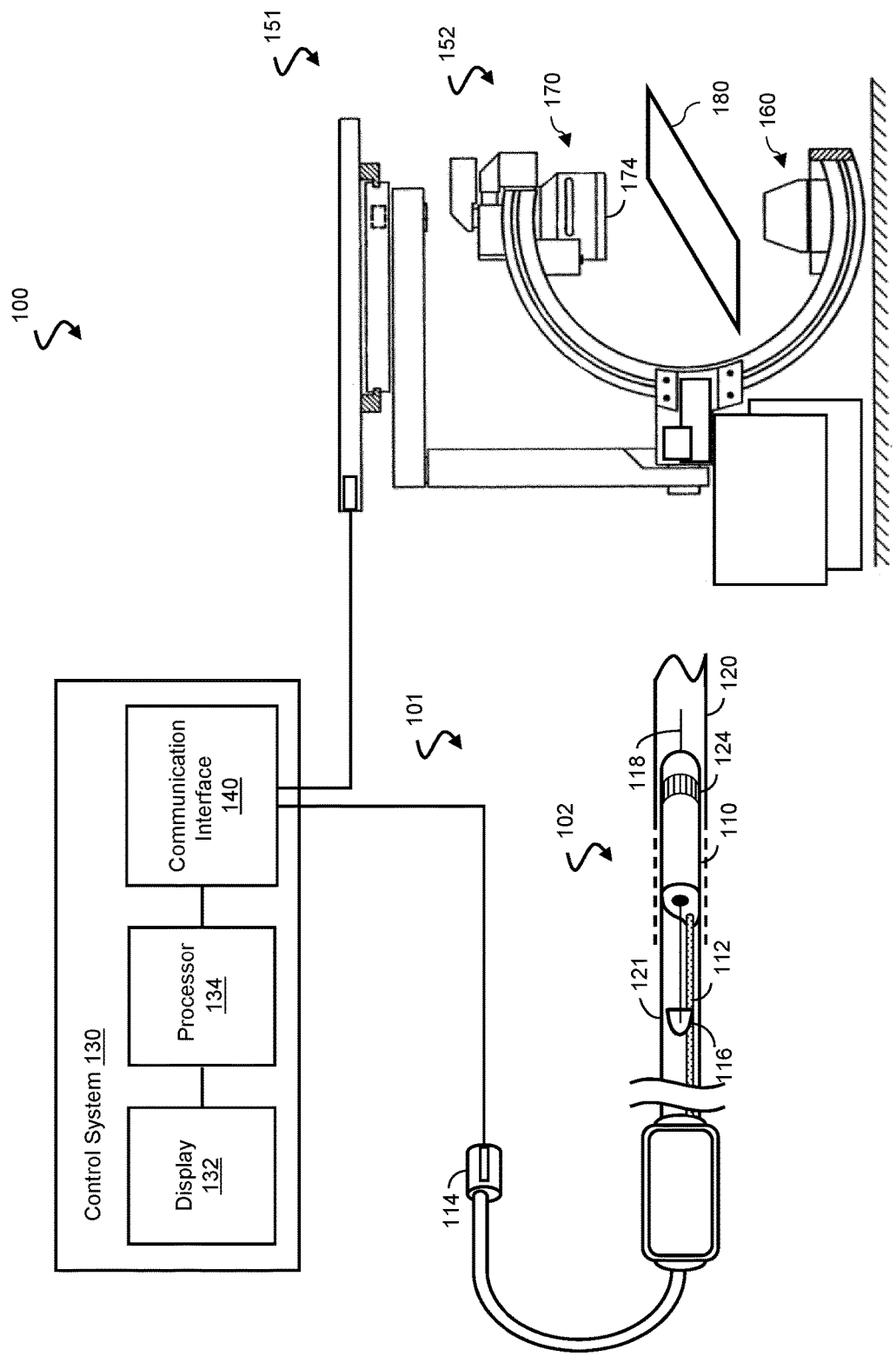
FIG. 1 is a schematic diagram of an intraluminal imaging and x-ray system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

The devices, systems, and methods described herein can include one or more features described in U.S. Provisional Application No. 63/187,962, filed May 13, 2021, and titled "Coregistration Reliability with Extraluminal Image and Intraluminal Data", U.S. Provisional Application No. 63/187,964, filed May 13, 2021, and titled "Pathway Modification for Coregistration of Extraluminal Image and Intraluminal Data", U.S. Provisional Application No. 63/187,983, filed May 13, 2021, and titled "Coregistration of Intraluminal Data to Guidewire in Extraluminal Image Obtained Without Contrast", and U.S. Provisional Application No. 63/187,990, filed May 13, 2021, and titled "Preview of Intraluminal Ultrasound Image Along Longitudinal View of Body Lumen", each of which is incorporated by reference herein in its entirety.

The devices, systems, and methods described herein can also include one or more features described in European Application No. 21154591.8, filed Feb. 1, 2021, and titled "X-Ray and Intravascular Ultrasound Image Registration", which is incorporated by reference herein in its entirety.

The devices, systems, and methods described herein can also include one or more features described in U.S. Publication No. 2020/0129144, titled "Disease Specific and Treatment Type Specific Control of Intraluminal Ultrasound Imaging", U.S. Publication No. 2020/0129142, titled "Intraluminal Ultrasound Navigation Guidance and Associated Devices, Systems, And Methods", U.S. Publication No. 2020/0129148, titled "Intraluminal Ultrasound Imaging with Automatic and Assisted Labels And Bookmarks", U.S. Publication No. 2020/0129158, titled "Graphical Longitudinal Display for Intraluminal Ultrasound Imaging and Associated Devices, Systems, and Methods", U.S. Publication No. 2020/0129147, titled "Intraluminal Ultrasound Vessel Border Selection and Associated Devices, Systems, and Methods", U.S. Publication No. 2020/0129159, titled "Intraluminal Ultrasound Directional Guidance and Associated Devices, Systems, and Methods", U.S. Publication No. 2020/0129143, titled "Speed Determination for Intraluminal Ultrasound Imaging and Associated Devices, Systems, And Methods", each of which is incorporated by reference herein in its entirety.

FIG. 1 is a schematic diagram of an intraluminal imaging and x-ray system 100, according to aspects of the present disclosure. In some embodiments, the intraluminal imaging and x-ray system 100 may include two separate systems or be a combination of two systems: an intraluminal sensing system 101 and an extraluminal imaging system 151. The intraluminal sensing system 101 obtains medical data about a patient's body while the intraluminal device 102 is positioned inside the patient's body. For example, the intraluminal sensing system 101 can control the intraluminal device 102 to obtain intraluminal images of the inside of the patient's body while the intraluminal device 102 is inside the patient's body. The extraluminal imaging system 151 obtains medical data about the patient's body while the extraluminal imaging device 152 is positioned outside the patient's body. For example, the extraluminal imaging system 151 can control extraluminal imaging device 152 to obtain extraluminal images of the inside of the patient's body while the extraluminal imaging device 152 is outside the patient's body.

The intraluminal imaging system 101 may be in communication with the extraluminal imaging system 151 through any suitable components. Such communication may be established through a wired cable, through a wireless signal, or by any other means. In addition, the intraluminal imaging system 101 may be in continuous communication with the x-ray system 151 or may be in intermittent communication. For example, the two systems may be brought into temporary communication via a wired cable, or brought into communication via a wireless communication, or through any other suitable means at some point before, after, or during an examination. In addition, the intraluminal system 101 may receive data such as x-ray images, annotated x-ray images, metrics calculated with the x-ray imaging system 151, information regarding dates and times of examinations, types and/or severity of patient conditions or diagnoses, patient history or other patient information, or any suitable data or information from the x-ray imaging system 151. The x-ray imaging system 151 may also receive any of these data from the intraluminal imaging system 101. In some embodiments, and as shown in FIG. 1, the intraluminal imaging system 101 and the x-ray imaging system 151 may be in communication with the same control system 130. In this embodiment, both systems may be in communication with the same display 132, processor 134, and communication interface 140 shown as well as in communication with any other components implemented within the control system 130.

In some embodiments, the system 100 may not include a control system 130 in communication with the intraluminal imaging system 101 and the x-ray imaging system 151. Instead, the system 100 may include two separate control systems. For example, one control system may be in communication with or be a part of the intraluminal imaging system 101 and an additional separate control system may be in communication with or be a part of the x-ray imaging system 151. In this embodiment, the separate control systems of both the intraluminal imaging system 101 and the x-ray imaging system 151 may be similar to the control system 130. For example, each control system may include various components or systems such as a communication interface, processor, and/or a display. In this embodiment, the control system of the intraluminal imaging system 101 may perform any or all of the coregistration steps described in the present disclosure. Alternatively, the control system of the x-ray imaging system 151 may perform the coregistration steps described.

The intraluminal imaging system 101 can be an ultrasound imaging system. In some instances, the intraluminal imaging system 101 can be an intravascular ultrasound (IVUS) imaging system. The intraluminal imaging system 101 may include an intraluminal imaging device 102, such as a catheter, guide wire, or guide catheter, in communication with the control system 130. The control system 130 may include a display 132, a processor 134, and a communication interface 140 among other components. The intraluminal imaging device 102 can be an ultrasound imaging device. In some instances, the device 102 can be an IVUS imaging device, such as a solid-state IVUS device.

At a high level, the IVUS device 102 emits ultrasonic energy from a transducer array 124 included in a scanner assembly, also referred to as an IVUS imaging assembly, mounted near a distal end of the catheter device. The ultrasonic energy is reflected by tissue structures in the surrounding medium, such as a vessel 120, or another body lumen surrounding the scanner assembly 110, and the ultrasound echo signals are received by the transducer array 124. In that regard, the device 102 can be sized, shaped, or otherwise configured to be positioned within the body lumen of a patient. The communication interface 140 transfers the received echo signals to the processor 134 of the control system 130 where the ultrasound image (including flow information in some embodiments) is reconstructed and displayed on the display 132. The control system 130, including the processor 134, can be operable to facilitate the features of the IVUS imaging system 101 described herein. For example, the processor 134 can execute computer readable instructions stored on the non-transitory tangible computer readable medium.

The communication interface 140 facilitates communication of signals between the control system 130 and the scanner assembly 110 included in the IVUS device 102. This communication includes the steps of: (1) providing commands to integrated circuit controller chip(s) included in the scanner assembly 110 to select the particular transducer array element(s), or acoustic element(s), to be used for transmit and receive, (2) providing the transmit trigger signals to the integrated circuit controller chip(s) included in the scanner assembly 110 to activate the transmitter circuitry to generate an electrical pulse to excite the selected transducer array element(s), and/or (3) accepting amplified echo signals received from the selected transducer array element(s) via amplifiers included on the integrated circuit controller chip(s) of the scanner assembly 110. In some embodiments, the communication interface 140 performs preliminary processing of the echo data prior to relaying the data to the processor 134. In examples of such embodiments, the communication interface 140 performs amplification, filtering, and/or aggregating of the data. In an embodiment, the communication interface 140 also supplies high- and low-voltage DC power to support operation of the device 102 including circuitry within the scanner assembly 110.

The processor 134 receives the echo data from the scanner assembly 110 by way of the communication interface 140 and processes the data to reconstruct an image of the tissue structures in the medium surrounding the scanner assembly 110. The processor 134 outputs image data such that an image of the lumen 120, such as a cross-sectional image of the vessel 120, is displayed on the display 132. The lumen 120 may represent fluid filled or surrounded structures, both natural and man-made. The lumen 120 may be within a body of a patient. The lumen 120 may be a blood vessel, such as an artery or a vein of a patient's vascular system, including cardiac vasculature, peripheral vasculature, neural vasculature, renal vasculature, and/or any other suitable lumen inside the body. For example, the device 102 may be used to examine any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood, chambers or other parts of the heart, and/or other systems of the body. In addition to natural structures, the device 102 may be used to examine man-made structures such as, but without limitation, heart valves, stents, shunts, filters and other devices.

In some embodiments, the IVUS device includes some features similar to traditional solid-state IVUS catheters, such as the EagleEye® catheter, Visions PV 0.014P RX catheter, Visions PV 0.018 catheter, Visions PV 0.035, and Pioneer Plus catheter, each of which are available from Koninklijke Philips N.V, and those disclosed in U.S. Pat. No. 7,846,101 hereby incorporated by reference in its entirety. For example, the IVUS device 102 includes the scanner assembly 110 near a distal end of the device 102 and a transmission line bundle 112 extending along the longitudinal body of the device 102. The transmission line bundle or cable 112 can include a plurality of conductors, including one, two, three, four, five, six, seven, or more conductors. It is understood that any suitable gauge wire can be used for the conductors. In an embodiment, the cable 112 can include a four-conductor transmission line arrangement with, e.g., 41 AWG gauge wires. In an embodiment, the cable 112 can include a seven-conductor transmission line arrangement utilizing, e.g., 44 AWG gauge wires. In some embodiments, 43 AWG gauge wires can be used.

The transmission line bundle 112 terminates in a patient interface module (PIM) connector 114 at a proximal end of the device 102. The PIM connector 114 electrically couples the transmission line bundle 112 to the communication interface 140 and physically couples the IVUS device 102 to the communication interface 140. In some embodiments, the communication interface 140 may be a PIM. In an embodiment, the IVUS device 102 further includes a guide wire exit port 116. Accordingly, in some instances the IVUS device 102 is a rapid-exchange catheter. The guide wire exit port 116 allows a guide wire 118 to be inserted towards the distal end to direct the device 102 through the vessel 120.

In some embodiments, the intraluminal imaging device 102 may acquire intravascular images of any suitable imaging modality, including optical coherence tomography (OCT) and intravascular photoacoustic (IVPA).

In some embodiments, the intraluminal device 102 is a pressure sensing device (e.g., pressure-sensing guidewire) that obtains intraluminal (e.g., intravascular) pressure data, and the intraluminal system 101 is an intravascular pressure sensing system that determines pressure ratios based on the pressure data, such as fractional flow reserve (FFR), instantaneous wave-free ratio (iFR), and/or other suitable ratio between distal pressure and proximal/aortic pressure (Pd/Pa). In some embodiments, the intraluminal device 102 is a flow sensing device (e.g., flow-sensing guidewire) that obtains intraluminal (e.g., intravascular) flow data, and the intraluminal system 101 is an intravascular flow sensing system that determines flow-related values based on the pressure data, such as coronary flow reserve (CFR), flow velocity, flow volume, etc.

The x-ray imaging system 151 may include an x-ray imaging apparatus or device 152 configured to perform x-ray imaging, angiography, fluoroscopy, radiography, venography, among other imaging techniques. The x-ray imaging system 151 can generate a single x-ray image (e.g., an angiogram or venogram) or multiple (e.g., two or more) x-ray images (e.g., a video and/or fluoroscopic image stream) based on x-ray image data collected by the x-ray device 152. The x-ray imaging device 152 may be of any suitable type, for example, it may be a stationary x-ray system such as a fixed c-arm x-ray device, a mobile c-arm x-ray device, a straight arm x-ray device, or a u-arm device. The x-ray imaging device 152 may additionally be any suitable mobile device. The x-ray imaging device 152 may also be in communication with the control system 130. In some embodiments, the x-ray system 151 may include a digital radiography device or any other suitable device.

The x-ray device 152 as shown in FIG. 1 includes an x-ray source 160 and an x-ray detector 170 including an input screen 174. The x-ray source 160 and the detector 170 may be mounted at a mutual distance. Positioned between the x-ray source 160 and the x-ray detector 170 may be an anatomy of a patient or object 180. For example, the anatomy of the patient (including the vessel 120) can be positioned between the x-ray source 160 and the x-ray detector 170.

The x-ray source 160 may include an x-ray tube adapted to generate x-rays. Some aspects of the x-ray source 160 may include one or more vacuum tubes including a cathode in connection with a negative lead of a high-voltage power source and an anode in connection with a positive lead of the same power source. The cathode of the x-ray source 160 may additionally include a filament. The filament may be of any suitable type or constructed of any suitable material, including tungsten or rhenium tungsten, and may be positioned within a recessed region of the cathode. One function of the cathode may be to expel electrons from the high voltage power source and focus them into a well-defined beam aimed at the anode. The anode may also be constructed of any suitable material and may be configured to create x-radiation from the emitted electrons of the cathode. In addition, the anode may dissipate heat created in the process of generating x-radiation. The anode may be shaped as a beveled disk and, in some embodiments, may be rotated via an electric motor. The cathode and anode of the x-ray source 160 may be housed in an airtight enclosure, sometimes referred to as an envelope.

In some embodiments, the x-ray source 160 may include a radiation object focus which influences the visibility of an image. The radiation object focus may be selected by a user of the system 100 or by a manufacture of the system 100 based on characteristics such as blurring, visibility, heat-dissipating capacity, or other characteristics. In some embodiments, an operator or user of the system 100 may switch between different provided radiation object foci in a point-of-care setting.

The detector 170 may be configured to acquire x-ray images and may include the input screen 174. The input screen 174 may include one or more intensifying screens configured to absorb x-ray energy and convert the energy to light. The light may in turn expose a film. The input screen 174 may be used to convert x-ray energy to light in embodiments in which the film may be more sensitive to light than x-radiation. Different types of intensifying screens within the image intensifier may be selected depending on the region of a patient to be imaged, requirements for image detail and/or patient exposure, or any other factors. Intensifying screens may be constructed of any suitable materials, including barium lead sulfate, barium strontium sulfate, barium fluorochloride, yttrium oxysulfide, or any other suitable material. The input screen 374 may be a fluorescent screen or a film positioned directly adjacent to a fluorescent screen. In some embodiments, the input screen 374 may also include a protective screen to shield circuitry or components within the detector 370 from the surrounding environment. In some embodiments, the x-ray detector 170 may include a flat panel detector (FPD). The detector 170 may be an indirect conversion FPD or a direct conversion FPD. The detector 170 may also include charge-coupled devices (CCDs). The x-ray detector 370 may additionally be referred to as an x-ray sensor.

The object 180 may be any suitable object to be imaged. In an exemplary embodiment, the object may be the anatomy of a patient. More specifically, the anatomy to be imaged may include chest, abdomen, the pelvic region, neck, legs, head, feet, a region with cardiac vasculature, or a region containing the peripheral vasculature of a patient and may include various anatomical structures such as, but not limited to, organs, tissue, blood vessels and blood, gases, or any other anatomical structures or objects. In other embodiments, the object may be or include man-made structures.

In some embodiments, the x-ray imaging system 151 may be configured to obtain x-ray images without contrast. In some embodiments, the x-ray imaging system 151 may be configured to obtain x-ray images with contrast (e.g., angiogram or venogram). In such embodiments, a contrast agent or x-ray dye may be introduced to a patient's anatomy before imaging. The contrast agent may also be referred to as a radiocontrast agent, contrast material, contrast dye, or contrast media. The contrast dye may be of any suitable material, chemical, or compound and may be a liquid, powder, paste, tablet, or of any other suitable form. For example, the contrast dye may be iodine-based compounds, barium sulfate compounds, gadolinium-based compounds, or any other suitable compounds. The contrast agent may be used to enhance the visibility of internal fluids or structures within a patient's anatomy. The contrast agent may absorb external x-rays, resulting in decreased exposure on the x-ray detector 170.

In some embodiments, the extraluminal imaging system 151 could be any suitable extraluminal imaging device, such as computed tomography (CT) or magnetic resonance imaging (MRI).

When the control system 130 is in communication with the x-ray system 151, the communication interface 140 facilitates communication of signals between the control system 130 and the x-ray device 152. This communication includes providing control commands to the x-ray source 160 and/or the x-ray detector 170 of the x-ray device 152 and receiving data from the x-ray device 152. In some embodiments, the communication interface 140 performs preliminary processing of the x-ray data prior to relaying the data to the processor 134. In examples of such embodiments, the communication interface 140 may perform amplification, filtering, and/or aggregating of the data. In an embodiment, the communication interface 140 also supplies high- and low-voltage DC power to support operation of the device 152 including circuitry within the device.

The processor 134 receives the x-ray data from the x-ray device 152 by way of the communication interface 140 and processes the data to reconstruct an image of the anatomy being imaged. The processor 134 outputs image data such that an image is displayed on the display 132. In an embodiment in which the contrast agent is introduced to the anatomy of a patient and a venogram is to be generated, the particular areas of interest to be imaged may be one or more blood vessels or other section or part of the human vasculature. The contrast agent may identify fluid filled structures, both natural and/or man-made, such as arteries or veins of a patient's vascular system, including cardiac vasculature, peripheral vasculature, neural vasculature, renal vasculature, and/or any other suitable lumen inside the body. For example, the x-ray device 152 may be used to examine any number of anatomical locations and tissue types, including without limitation all the organs, fluids, or other structures or parts of an anatomy previously mentioned. In addition to natural structures, the x-ray device 152 may be used to examine man-made structures such as any of the previously mentioned structures.

The processor 134 may be configured to receive an x-ray image that was stored by the x-ray imaging device 152 during a clinical procedure. The images may be further enhanced by other information such as patient history, patient record, IVUS imaging, pre-operative ultrasound imaging, pre-operative CT, or any other suitable data.

Figure 2:
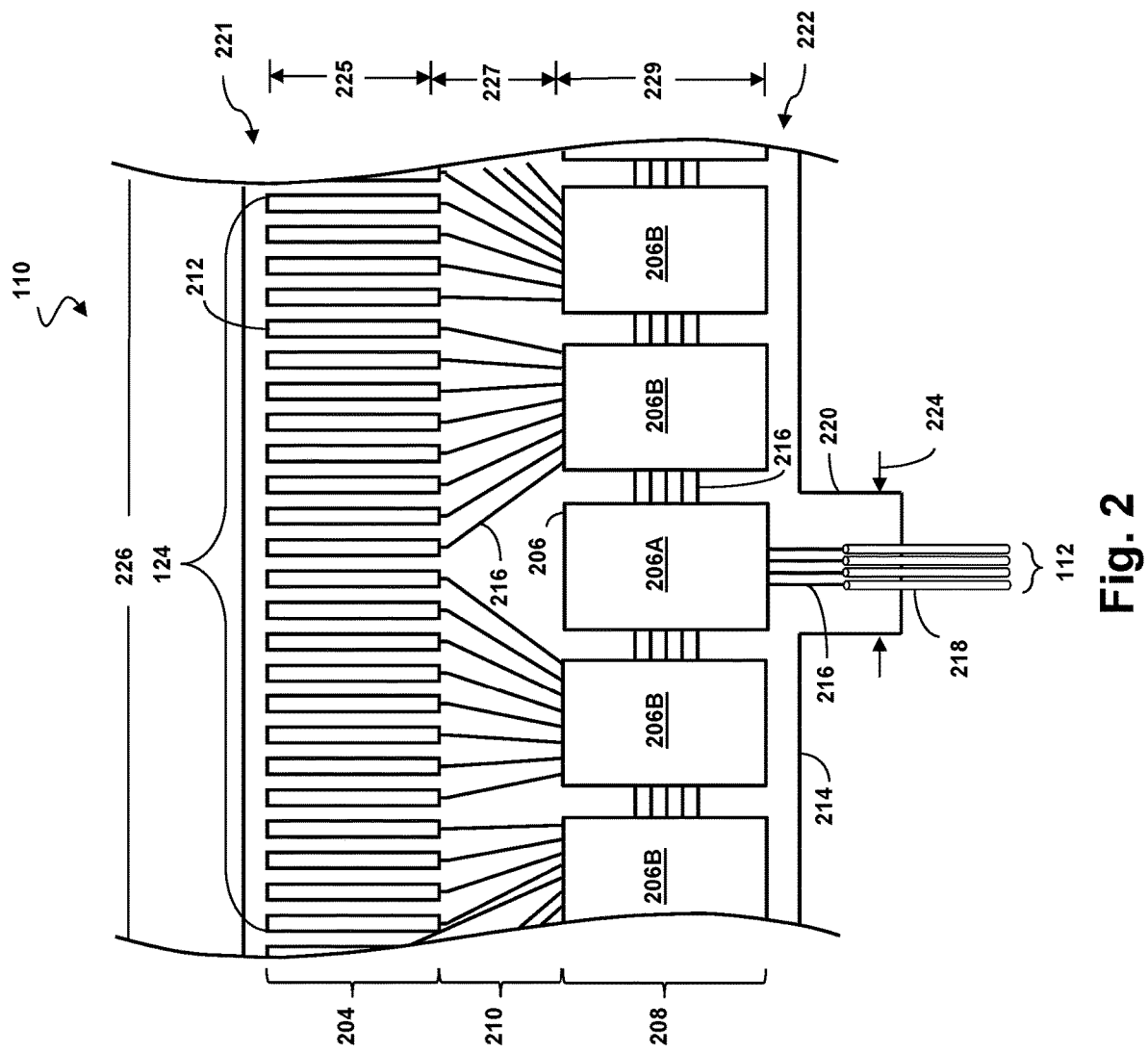
FIG. 2 is a diagrammatic top view of an ultrasound imaging assembly in a flat configuration, according to aspects of the present disclosure.

FIG. 2 is a diagrammatic top view of a portion of a flexible assembly 110, according to aspects of the present disclosure. The flexible assembly 110 includes a transducer array 124 formed in a transducer region 204 and transducer control logic dies 206 (including dies 206A and 206B) formed in a control region 208, with a transition region 210 disposed therebetween. The transducer array 124 includes an array of ultrasound transducer elements 212. The transducer control logic dies 206 are mounted on a flexible substrate 214 into which the transducer elements 212 have been previously integrated. The flexible substrate 214 is shown in a flat configuration in FIG. 2. Though six control logic dies 206 are shown in FIG. 2, any number of control logic dies 206 may be used. For example, one, two, three, four, five, six, seven, eight, nine, ten, or more control logic dies 206 may be used.

The flexible substrate 214, on which the transducer control logic dies 206 and the transducer elements 212 are mounted, provides structural support and interconnects for electrical coupling. The flexible substrate 214 may be constructed to include a film layer of a flexible polyimide material such as KAPTON™ (trademark of DuPont). Other suitable materials include polyester films, polyimide films, polyethylene napthalate films, or polyetherimide films, liquid crystal polymer, other flexible printed semiconductor substrates as well as products such as Upilex® (registered trademark of Ube Industries) and TEFLON® (registered trademark of E.I. du Pont). In the flat configuration illustrated in FIG. 2, the flexible substrate 214 has a generally rectangular shape. As shown and described herein, the flexible substrate 214 is configured to be wrapped around a support member 230 (FIG. 3) in some instances. Therefore, the thickness of the film layer of the flexible substrate 214 is generally related to the degree of curvature in the final assembled flexible assembly 110. In some embodiments, the film layer is between 5 μm and 100 μm, with some particular embodiments being between 5 μm and 25.1 μm, e.g., 6 μm.

The set of transducer control logic dies 206 is a non-limiting example of a control circuit. The transducer region 204 is disposed at a distal portion 221 of the flexible substrate 214. The control region 208 is disposed at a proximal portion 222 of the flexible substrate 214. The transition region 210 is disposed between the control region 208 and the transducer region 204. Dimensions of the transducer region 204, the control region 208, and the transition region 210 (e.g., lengths 225, 227, 229) can vary in different embodiments. In some embodiments, the lengths 225, 227, 229 can be substantially similar or, the length 227 of the transition region 210 may be less than lengths 225 and 229, the length 227 of the transition region 210 can be greater than lengths 225, 229 of the transducer region and controller region, respectively.

The control logic dies 206 are not necessarily homogenous. In some embodiments, a single controller is designated a master control logic die 206A and contains the communication interface for cable 112, between a processing system, e.g., processing system 106, and the flexible assembly 110. Accordingly, the master control circuit may include control logic that decodes control signals received over the cable 112, transmits control responses over the cable 112, amplifies echo signals, and/or transmits the echo signals over the cable 112. The remaining controllers are slave controllers 206B. The slave controllers 206B may include control logic that drives a plurality of transducer elements 512 positioned on a transducer element 212 to emit an ultrasonic signal and selects a transducer element 212 to receive an echo. In the depicted embodiment, the master controller 206A does not directly control any transducer elements 212. In other embodiments, the master controller 206A drives the same number of transducer elements 212 as the slave controllers 206B or drives a reduced set of transducer elements 212 as compared to the slave controllers 206B. In an exemplary embodiment, a single master controller 206A and eight slave controllers 206B are provided with eight transducers assigned to each slave controller 206B.

To electrically interconnect the control logic dies 206 and the transducer elements 212, in an embodiment, the flexible substrate 214 includes conductive traces 216 formed in the film layer that carry signals between the control logic dies 206 and the transducer elements 212. In particular, the conductive traces 216 providing communication between the control logic dies 206 and the transducer elements 212 extend along the flexible substrate 214 within the transition region 210. In some instances, the conductive traces 216 can also facilitate electrical communication between the master controller 206A and the slave controllers 206B. The conductive traces 216 can also provide a set of conductive pads that contact the conductors 218 of cable 112 when the conductors 218 of the cable 112 are mechanically and electrically coupled to the flexible substrate 214. Suitable materials for the conductive traces 216 include copper, gold, aluminum, silver, tantalum, nickel, and tin, and may be deposited on the flexible substrate 214 by processes such as sputtering, plating, and etching. In an embodiment, the flexible substrate 214 includes a chromium adhesion layer. The width and thickness of the conductive traces 216 are selected to provide proper conductivity and resilience when the flexible substrate 214 is rolled. In that regard, an exemplary range for the thickness of a conductive trace 216 and/or conductive pad is between 1-5 μm. For example, in an embodiment, 5 μm conductive traces 216 are separated by 5 μm of space. The width of a conductive trace 216 on the flexible substrate may be further determined by the width of the conductor 218 to be coupled to the trace or pad.

The flexible substrate 214 can include a conductor interface 220 in some embodiments. The conductor interface 220 can be in a location of the flexible substrate 214 where the conductors 218 of the cable 112 are coupled to the flexible substrate 214. For example, the bare conductors of the cable 112 are electrically coupled to the flexible substrate 214 at the conductor interface 220. The conductor interface 220 can be tab extending from the main body of flexible substrate 214. In that regard, the main body of the flexible substrate 214 can refer collectively to the transducer region 204, controller region 208, and the transition region 210. In the illustrated embodiment, the conductor interface 220 extends from the proximal portion 222 of the flexible substrate 214. In other embodiments, the conductor interface 220 is positioned at other parts of the flexible substrate 214, such as the distal portion 221, or the flexible substrate 214 may lack the conductor interface 220. A value of a dimension of the tab or conductor interface 220, such as a width 224, can be less than the value of a dimension of the main body of the flexible substrate 214, such as a width 226. In some embodiments, the substrate forming the conductor interface 220 is made of the same material(s) and/or is similarly flexible as the flexible substrate 214. In other embodiments, the conductor interface 220 is made of different materials and/or is comparatively more rigid than the flexible substrate 214. For example, the conductor interface 220 can be made of a plastic, thermoplastic, polymer, hard polymer, etc., including polyoxymethylene (e.g., DELRIN®), polyether ether ketone (PEEK), nylon, Liquid Crystal Polymer (LCP), and/or other suitable materials.

Figure 3:
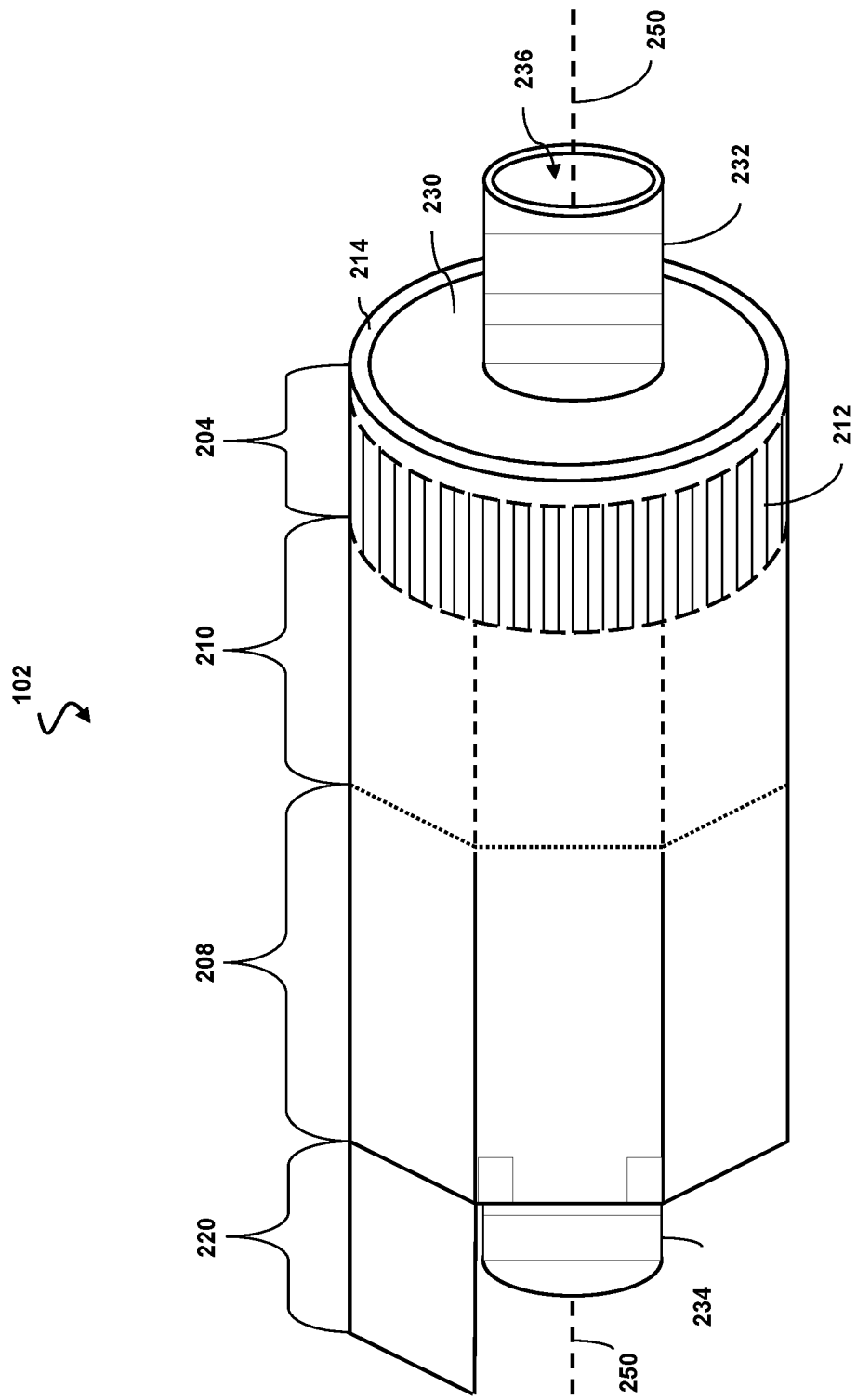
FIG. 3 is a diagrammatic perspective view of the ultrasound imaging assembly shown in FIG. 2 in a rolled configuration around a support member, according to aspects of the present disclosure.

FIG. 3 illustrates a perspective view of the scanner assembly 110 in a rolled configuration. In some instances, the flexible substrate 214 is transitioned from a flat configuration (FIG. 2) to a rolled or more cylindrical configuration (FIG. 3). For example, in some embodiments, techniques are utilized as disclosed in one or more of U.S. Pat. No. 6,776,763, titled "ULTRASONIC TRANSDUCER ARRAY AND METHOD OF MANUFACTURING THE SAME" and U.S. Pat. No. 7,226,417, titled "HIGH RESOLUTION INTRAVASCULAR ULTRASOUND SENSING ASSEMBLY HAVING A FLEXIBLE SUBSTRATE," each of which is hereby incorporated by reference in its entirety.

Depending on the application and embodiment of the presently disclosed invention, transducer elements 212 may be piezoelectric transducers, single crystal transducer, or PZT (lead zirconate titanate) transducers. In other embodiments, the transducer elements of transducer array 124 may be flexural transducers, piezoelectric micromachined ultrasonic transducers (PMUTs), capacitive micromachined ultrasonic transducers (CMUTs), or any other suitable type of transducer element. In such embodiments, transducer elements 212 may comprise an elongate semiconductor material or other suitable material that allows micromachining or similar methods of disposing extremely small elements or circuitry on a substrate.

In some embodiments, the transducer elements 212 and the controllers 206 can be positioned in an annular configuration, such as a circular configuration or in a polygon configuration, around a longitudinal axis 250 of a support member 230. It is understood that the longitudinal axis 250 of the support member 230 may also be referred to as the longitudinal axis of the scanner assembly 110, the flexible elongate member 121, or the device 102. For example, a cross-sectional profile of the imaging assembly 110 at the transducer elements 212 and/or the controllers 206 can be a circle or a polygon. Any suitable annular polygon shape can be implemented, such as one based on the number of controllers or transducers, flexibility of the controllers or transducers, etc. Some examples may include a pentagon, hexagon, heptagon, octagon, nonagon, decagon, etc. In some examples, the transducer controllers 206 may be used for controlling the ultrasound transducers 512 of transducer elements 212 to obtain imaging data associated with the vessel 120.

The support member 230 can be referenced as a unibody in some instances. The support member 230 can be composed of a metallic material, such as stainless steel, or a non-metallic material, such as a plastic or polymer as described in U.S. Provisional Application No. 61/985,220, "Pre-Doped Solid Substrate for Intravascular Devices," filed Apr. 28, 2014, the entirety of which is hereby incorporated by reference herein. In some embodiments, support member 230 may be composed of 303 stainless steel. The support member 230 can be a ferrule having a distal flange or portion 232 and a proximal flange or portion 234. The support member 230 can be tubular in shape and define a lumen 236 extending longitudinally therethrough. The lumen 236 can be sized and shaped to receive the guide wire 118. The support member 230 can be manufactured using any suitable process. For example, the support member 230 can be machined and/or electrochemically machined or laser milled, such as by removing material from a blank to shape the support member 230, or molded, such as by an injection molding process or a micro injection molding process.

Figure 4:
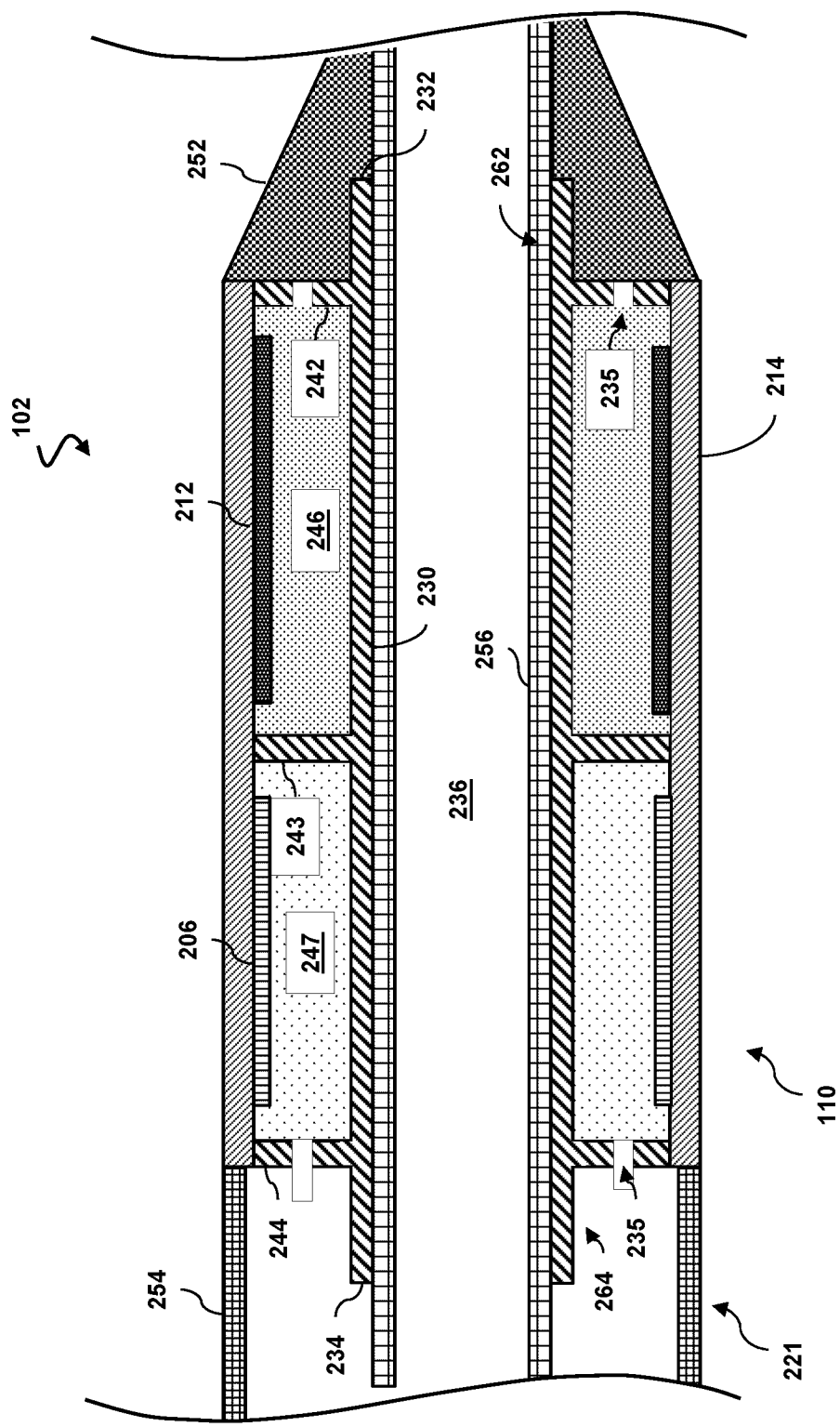
FIG. 4 is a diagrammatic cross-sectional side view of the ultrasound imaging assembly shown in FIG. 3, according to aspects of the present disclosure.

Referring now to FIG. 4, shown therein is a diagrammatic cross-sectional side view of a distal portion of the intraluminal imaging device 102, including the flexible substrate 214 and the support member 230, according to aspects of the present disclosure. The lumen 236 may be connected with the entry/exit port 116 and is sized and shaped to receive the guide wire 118 (FIG. 1). In some embodiments, the support member 230 may be integrally formed as a unitary structure, while in other embodiments the support member 230 may be formed of different components, such as a ferrule and stands 242, 243, and 244, that are fixedly coupled to one another. In some cases, the support member 230 and/or one or more components thereof may be completely integrated with inner member 256. In some cases, the inner member 256 and the support member 230 may be joined as one, e.g., in the case of a polymer support member.

Stands 242, 243, and 244 that extend vertically are provided at the distal, central, and proximal portions respectively, of the support member 230. The stands 242, 243, and 244 elevate and support the distal, central, and proximal portions of the flexible substrate 214. In that regard, portions of the flexible substrate 214, such as the transducer portion 204 (or transducer region 204), can be spaced from a central body portion of the support member 230 extending between the stands 242, 243, and 244. The stands 242, 243, 244 can have the same outer diameter or different outer diameters. For example, the distal stand 242 can have a larger or smaller outer diameter than the central stand 243 and/or proximal stand 244 and can also have special features for rotational alignment as well as control chip placement and connection.

To improve acoustic performance, the cavity between the transducer array 212 and the surface of the support member 230 may be filled with an acoustic backing material 246. The liquid backing material 246 can be introduced between the flexible substrate 214 and the support member 230 via passageway 235 in the stand 242, or through additional recesses as will be discussed in more detail hereafter. The backing material 246 may serve to attenuate ultrasound energy emitted by the transducer array 212 that propagates in the undesired, inward direction.

The cavity between the circuit controller chips 206 and the surface of the support member 230 may be filled with an underfill material 247. The underfill material 247 may be an adhesive material (e.g. an epoxy) which provides structural support for the circuit controller chips 206 and/or the flexible substrate 214. The underfill 247 may additionally be any suitable material.

In some embodiments, the central body portion of the support member can include recesses allowing fluid communication between the lumen of the unibody and the cavities between the flexible substrate 214 and the support member 230. Acoustic backing material 246 and/or underfill material 247 can be introduced via the cavities (during an assembly process, prior to the inner member 256 extending through the lumen of the unibody. In some embodiments, suction can be applied via the passageways 235 of one of the stands 242, 244, or to any other suitable recess while the liquid backing material 246 is fed between the flexible substrate 214 and the support member 230 via the passageways 235 of the other of the stands 242, 244, or any other suitable recess. The backing material can be cured to allow it to solidify and set. In various embodiments, the support member 230 includes more than three stands 242, 243, and 244, only one or two of the stands 242, 243, 244, or none of the stands. In that regard the support member 230 can have an increased diameter distal portion 262 and/or increased diameter proximal portion 264 that is sized and shaped to elevate and support the distal and/or proximal portions of the flexible substrate 214.

The support member 230 can be substantially cylindrical in some embodiments. Other shapes of the support member 230 are also contemplated including geometrical, non-geometrical, symmetrical, non-symmetrical, cross-sectional profiles. As the term is used herein, the shape of the support member 230 may reference a cross-sectional profile of the support member 230. Different portions of the support member 230 can be variously shaped in other embodiments. For example, the proximal portion 264 can have a larger outer diameter than the outer diameters of the distal portion 262 or a central portion extending between the distal and proximal portions 262, 264. In some embodiments, an inner diameter of the support member 230 (e.g., the diameter of the lumen 236) can correspondingly increase or decrease as the outer diameter changes. In other embodiments, the inner diameter of the support member 230 remains the same despite variations in the outer diameter.

A proximal inner member 256 and a proximal outer member 254 are coupled to the proximal portion 264 of the support member 230. The proximal inner member 256 and/or the proximal outer member 254 can comprise a flexible elongate member. The proximal inner member 256 can be received within a proximal flange 234. The proximal outer member 254 abuts and is in contact with the proximal end of flexible substrate 214. A distal tip member 252 is coupled to the distal portion 262 of the support member 230. For example, the distal member 252 is positioned around the distal flange 232. The tip member 252 can abut and be in contact with the distal end of flexible substrate 214 and the stand 242. In other embodiments, the proximal end of the tip member 252 may be received within the distal end of the flexible substrate 214 in its rolled configuration. In some embodiments there may be a gap between the flexible substrate 214 and the tip member 252. The distal member 252 can be the distal-most component of the intraluminal imaging device 102. The distal tip member 252 may be a flexible, polymeric component that defines the distal-most end of the imaging device 102. The distal tip member 252 may additionally define a lumen in communication with the lumen 236 defined by support member 230. The guide wire 118 may extend through lumen 236 as well as the lumen defined by the tip member 252.

One or more adhesives can be disposed between various components at the distal portion of the intraluminal imaging device 102. For example, one or more of the flexible substrate 214, the support member 230, the distal member 252, the proximal inner member 256, the transducer array 212, and/or the proximal outer member 254 can be coupled to one another via an adhesive. Stated differently, the adhesive can be in contact with e.g. the transducer array 212, the flexible substrate 214, the support member 230, the distal member 252, the proximal inner member 256, and/or the proximal outer member 254, among other components.

Figure 5:
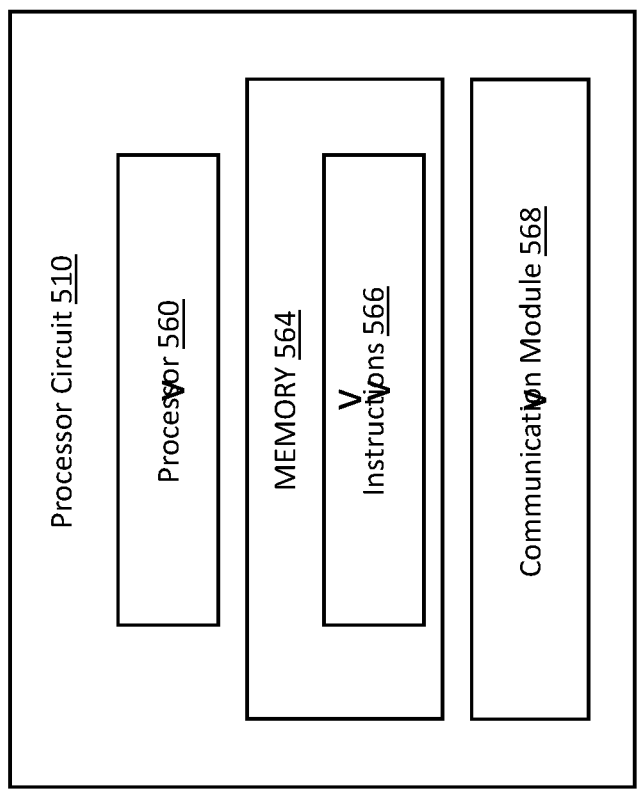
FIG. 5 is a schematic diagram of a processor circuit, according to aspects of the present disclosure.

FIG. 5 is a schematic diagram of a processor circuit, according to aspects of the present disclosure. The processor circuit 510 may be implemented in the control system 130 of FIG. 1, the intraluminal imaging system 101, and/or the x-ray imaging system 151, or any other suitable location. In an example, the processor circuit 510 may be in communication with intraluminal imaging device 102, the x-ray imaging device 152, the display 132 within the system 100. The processor circuit 510 may include the processor 134 and/or the communication interface 140 (FIG. 1). One or more processor circuits 510 are configured to execute the operations described herein. As shown, the processor circuit 510 may include a processor 560, a memory 564, and a communication module 568. These elements may be in direct or indirect communication with each other, for example via one or more buses.

The processor 560 may include a CPU, a GPU, a DSP, an application-specific integrated circuit (ASIC), a controller, an FPGA, another hardware device, a firmware device, or any combination thereof configured to perform the operations described herein. The processor 560 may also be implemented as a combination of computing devices, e.g., a combination of a DSP and a microprocessor, a plurality of microprocessors, one or more microprocessors in conjunction with a DSP core, or any other such configuration.

The memory 564 may include a cache memory (e.g., a cache memory of the processor 560), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 564 includes a non-transitory computer-readable medium. The memory 564 may store instructions 566. The instructions 566 may include instructions that, when executed by the processor 560, cause the processor 560 to perform the operations described herein with reference to the probe 110 and/or the host 130 (FIG. 1). Instructions 566 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 568 can include any electronic circuitry and/or logic circuitry to facilitate direct or indirect communication of data between the processor circuit 510, the probe 110, and/or the display 132 and/or display 132. In that regard, the communication module 568 can be an input/output (I/O) device. In some instances, the communication module 568 facilitates direct or indirect communication between various elements of the processor circuit 510 and/or the probe 110 (FIG. 1) and/or the host 130 (FIG. 1).

Figure 6:
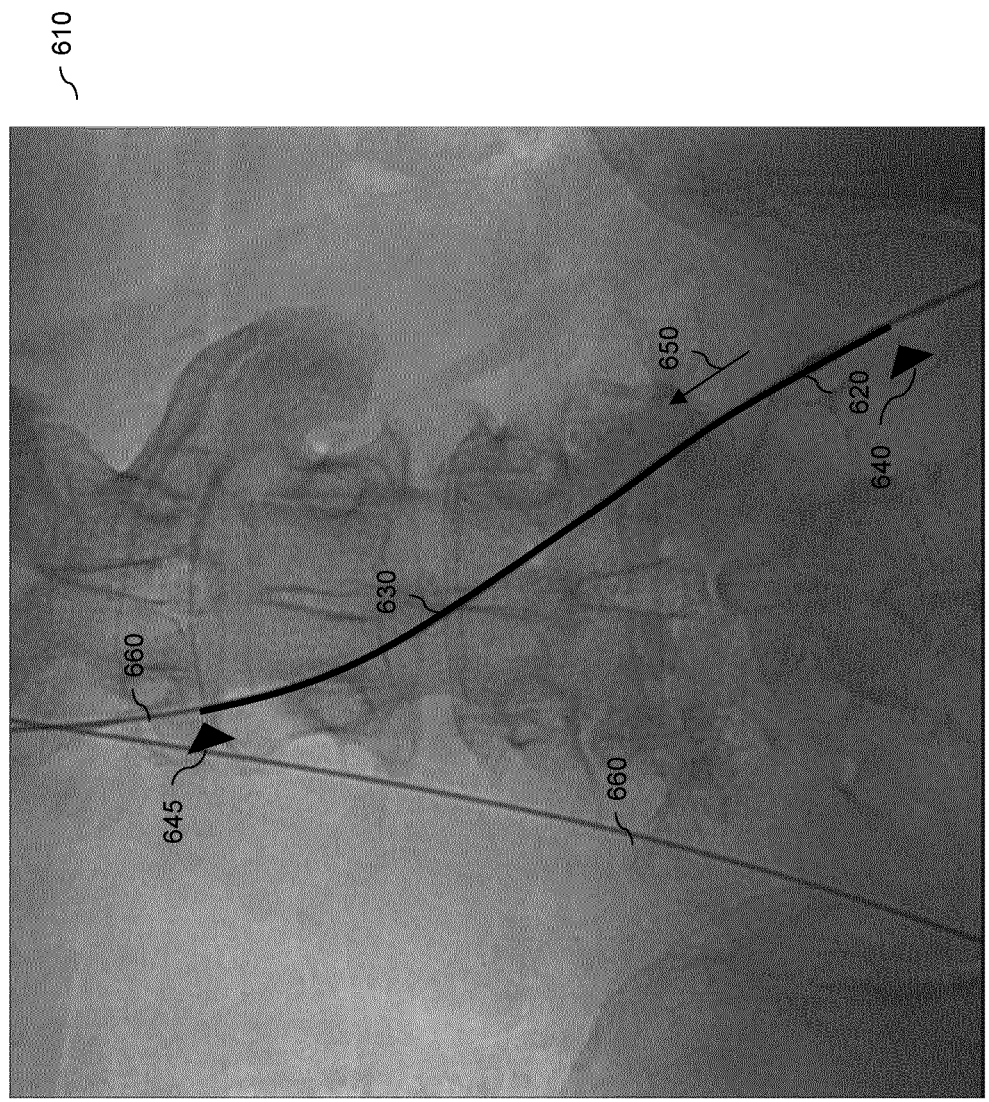
FIG. 6 is a diagrammatic view of an x-ray fluoroscopy image illustrating a pullback procedure, according to aspects of the present disclosure.

FIG. 6 is a diagrammatic view of an x-ray fluoroscopy image illustrating a pullback procedure, according to aspects of the present disclosure. FIG. 6 depicts an x-ray fluoroscopy image 610 showing an intravascular device 620 and guidewires 660. FIG. 6 additionally depicts an intravascular device path 630, a starting indicator 640, an ending indicator 645, and a directional arrow 650.

During a pullback procedure, one or more guidewires 660 may be positioned within one or more lumens of a patient. Because the guidewire 660 may be constructed of a flexible material, the shape of the guidewire 660 may conform to the shape of the lumen in which the guidewire 660 is positioned. The guidewire 660 may include a flexible elongate member. An intravascular device 620 may be positioned within the lumen and travel through the lumen along a guidewire 660, which is positioned within a guidewire lumen of the intravascular device 620. The intravascular device 620 can be a catheter or a guide catheter. The intravascular device 620 may be an IVUS catheter. The device 620 may be constructed of a flexible material, such that the shape of the device 620 may match the curvature of the lumen in which the device 620 is positioned. The intravascular device 620 may include a flexible elongate member. In the fluoroscopy image 610, a radiopaque portion of the intravascular device 620 is visible. The intravascular device 620 may be substantially similar to the device 102 of the intraluminal ultrasound imaging system 101. A user of the system 100 may position the intravascular device 620 at a starting location shown by the indicator 640. With the intravascular device 620 placed at the starting location, the user may begin acquiring fluoroscopy images with the x-ray imaging system 151. The image 610 may be one of the many x-ray fluoroscopy images obtained during the pullback. In some embodiments, the fluoroscopy image 610 is an x-ray image obtained while no contrast agent is present within the patient anatomy. In such an embodiment, the lumens (e.g., blood vessel) of the patient may be identified primarily by the positioning of the guidewires 660 within the lumens. In other embodiments, the image 610 may be an x-ray image obtained while a contrast agent is present within the patient anatomy. The contrast agent may make vessel lumens visible within the image 610.

One or a plurality of radiopaque portions of the guidewire 660 are visible in the x-ray image(s) 610 obtained without contrast. The radiopaque portions can be one length or a plurality of lengths of the guidewire 660. In some embodiments, the radiopaque portions of the guidewire 660 are one or a plurality of radiopaque markers. The radiopaque markers can be made of a different material that is more radiopaque than the material used to form other parts of the guidewire 660. In some embodiments, all or substantially all of the guidewire 660 can be radiopaque. In some embodiments, all or substantially all of the portion of the guidewire 660 within the patient body can be radiopaque. In some embodiments, all or substantially all of the distal portion of the guidewire 660 (e.g., the portion of the guidewire being imaged by x-ray) can be radiopaque. For example, the guidewire 660 can be sufficiently thick (e.g., a sufficiently large diameter) to provide radiopacity in x-ray images 610. Such embodiments can include clinical applications in the peripheral venous system, which can involve guidewires with a diameter between 0.014" and 0.038", including values such as 0.014", 0.018", 0.035", 0.038", and/or other values both larger and smaller.

While the x-ray imaging system 151 acquires fluoroscopy images, the user of the system 100 may then begin to move device 620 through the patient lumen along the guidewire 660. The user may pull the device in a direction shown by the arrow 650. As the device 620 moves along the guidewire 660 through the lumen, the device 620 shown in newly acquired fluoroscopy images is shown to move in the direction shown by the arrow 650. The user may continue to pull the device 620 along the guidewire 660 until an ending position 645. The path taken by the device 620 during the pullback procedure may be illustrated by the path 630 within FIG. 6.

As the device 620 moves from the starting position shown by the indicator 640 to the ending position shown by the indicator 645, it may acquire any suitable intravascular data, such as IVUS images. After the device 620 has moved to the ending position, the user may stop acquiring fluoroscopy images with the x-ray imaging system 151 and may remove the device 620 from the lumen. Because the intravascular data was obtained with the device 620 while fluoroscopy images were simultaneously acquired, the intravascular data may be coregistered to the places along the path 630 at which each datum was collected and displayed in relation to that location along the path 630 and/or a representative fluoroscopy image as will be described with greater detail with reference to FIG. 7.

In some embodiments, the intravascular device 620 may be moved in an opposite direction. For example, the device may be moved from the position of indicator 645 to the position of indicator 640. In other words, the device 620 may move from a distal region to a proximal region (e.g., a pullback) or may move from a proximal region to a distal region (e.g., push forward) during the imaging procedure.

It is noted, that the starting and ending positions may represent target locations during an IVUS imaging procedure. Any indicators, such as indicators 640 and/or 645, identifying these locations may not be visible within an x-ray image displayed to a user during a pullback procedure. For example, during an imaging procedure, the system may identify the starting location of the device 620 on the display, but the ending location of the device 620 is not known because the procedure is still in the process of being completed. However, after an IVUS imaging procedure or pullback procedure is completed, during a review phase of the process, indicators 640 and/or 645 identifying both the starting location and the ending location may be displayed to a user of the system.

Figure 7:
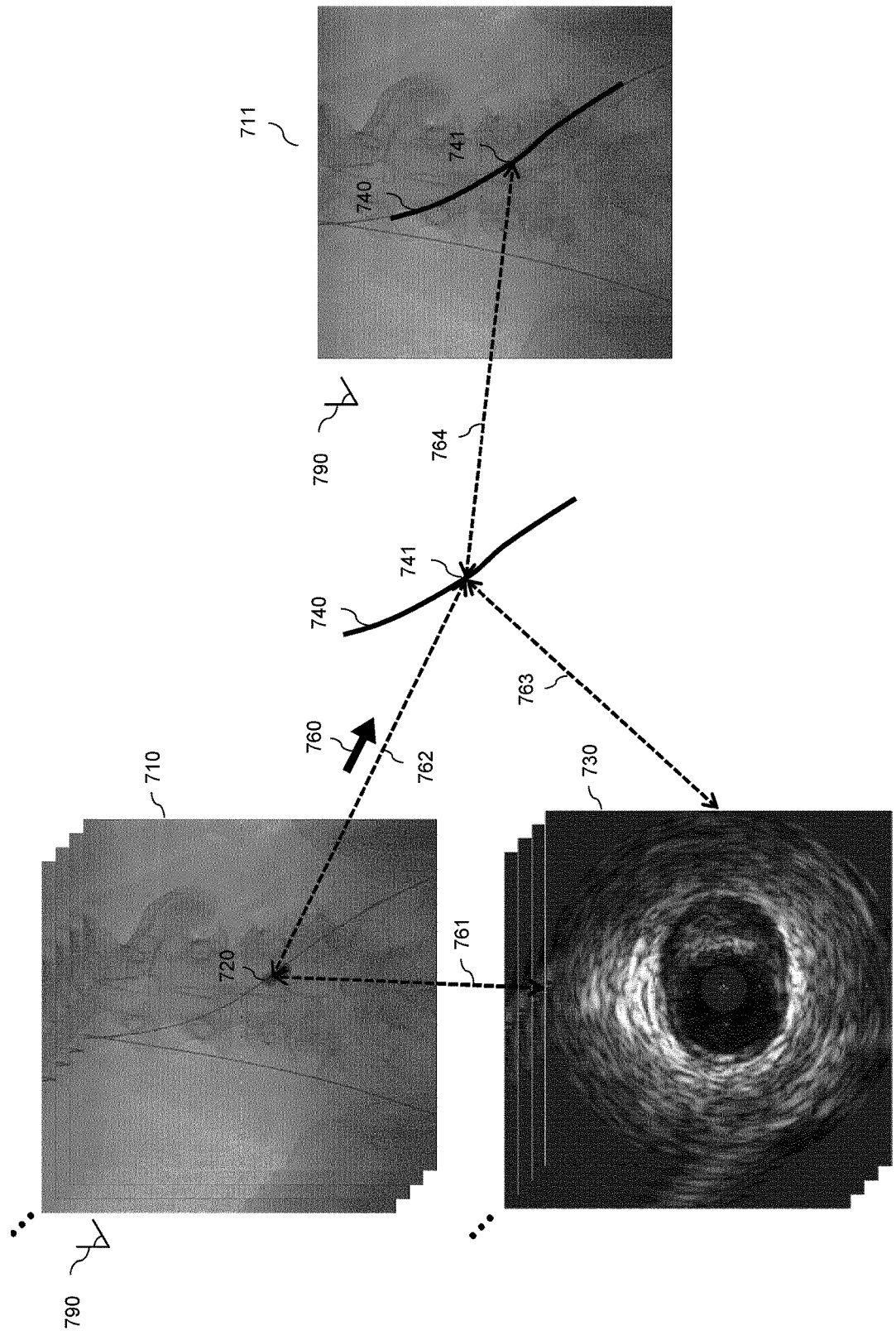
FIG. 7 is a diagrammatic view of a relationship between x-ray fluoroscopy images, intravascular data, and a path defined by the motion of an intravascular device, according to aspects of the present disclosure.

FIG. 7 is a diagrammatic view of a relationship between x-ray fluoroscopy images 710, intravascular data 730, and a path 740 defined by the motion of an intravascular device, according to aspects of the present disclosure. FIG. 7 describes a method of coregistering intravascular data 730 including intravascular images with corresponding locations on one or more fluoroscopy images 710 of the same region of a patient's anatomy.

The patient anatomy may be imaged with an x-ray device while a physician performs a pullback with an intravascular device 720, e.g., while the intravascular device 720 moves through a blood vessel of the anatomy. The intravascular device may be substantially similar to the intravascular device 102 described with reference to FIG. 1. The x-ray device used to obtain the fluoroscopy images 710 may be substantially similar to the x-ray device 152 of FIG. 1. In some embodiments, the fluoroscopy images 710 may be obtained while no contrast agent is present within the patient vasculature. Such an embodiment is shown by the fluoroscopy images 710 in FIG. 7. The radiopaque portion of the intravascular device 720 is visible within the fluoroscopy image 710. The fluoroscopy images 710 may correspond to a continuous image stream of fluoroscopy images and may be obtained as the patient anatomy is exposed to a reduced dose of x-radiation. It is noted that the fluoroscopy images 710 may be acquired with the x-ray source 160 and the x-ray detector 170 positioned at any suitable angle in relation to the patient anatomy. This angle is shown by angle 790.

The intravascular device 720 may be any suitable intravascular device. As the intravascular device 720 moves through the patient vasculature, the x-ray imaging system may acquire multiple fluoroscopy images 710 showing the radiopaque portion of the intravascular device 720. In this way, each fluoroscopy image 710 shown in FIG. 7 may depict the intravascular device 720 positioned at a different location such that a processor circuit may automatically track the position of the intravascular device 720 over time.

As the intravascular device 720 is pulled through the patient vasculature, it may acquire intravascular data 730. In an example, the intravascular data 730 shown in FIG. 7 may be IVUS images. However, the intravascular data may be any suitable data, including IVUS images, FFR data, iFR data, OCT images, intravascular photoacoustic (IVPA) images, or any other measurements or metrics relating to blood pressure, blood flow, lumen structure, or other physiological data acquired during a pullback of an intravascular device.

As the physician pulls the intravascular device 720 through the patient vasculature, each intravascular data point 730 acquired by the intravascular device 720 may be associated with a position within the patient anatomy in the fluoroscopy images 710, as indicated by the arrow 761. For example, the first IVUS image 730 shown in FIG. 7 may be associated with the first fluoroscopy image 710. The first IVUS image 730 may be an image acquired by the intravascular device 720 at a position within the vasculature, as depicted in the first fluoroscopy image 710 as shown by the intravascular device 720 within the image 710. Similarly, an additional IVUS image 730 may be associated with an additional fluoroscopy image 710 showing the intravascular device 720 at a new location within the image 710, and so on. The processor circuit may determine the locations of the intravascular device 720 within each acquired x-ray image 710 by any suitable method. For example, the processor circuit may perform various image processing techniques, such as edge identification of the radiopaque marker, pixel-by-pixel analysis to determine transition between light pixels and dark pixels, filtering, or any other suitable techniques to determine the location of the imaging device 720. In some embodiments, the processor circuit may use various artificial intelligence methods including deep learning techniques such as neural networks or any other suitable techniques to identify the locations of the imaging device 720 within the x-ray images 710.

Any suitable number of IVUS images or other intravascular data points 730 may be acquired during an intravascular device pullback and any suitable number of fluoroscopy images 710 may be obtained. In some embodiments, there may be a one-to-one ratio of fluoroscopy images 710 and intravascular data 730. In other embodiments, there may be differing numbers of fluoroscopy images 710 and/or intravascular data 730. The process of co-registering the intravascular data 730 with one or more x-ray images may include some features similar to those described in U.S. Pat. No. 7,930,014, titled, "VASCULAR IMAGE CO-REGISTRATION," and filed Jan. 11, 2006, which is hereby incorporated by reference in its entirety. The co-registration process may also include some features similar to those described in U.S. Pat. Nos. 8,290,228, 8,463,007, 8,670,603, 8,693,756, 8,781,193, 8,855,744, and 10,076,301, all of which are also hereby incorporated by reference in their entirety.

The system 100 may additionally generate a fluoroscopy-based 2D pathway 740 defined by the positions of the intravascular device 720 within the x-ray fluoroscopy images 710. The different positions of the intravascular device 720 during pullback, as shown in the fluoroscopy images 710, may define a two-dimensional pathway 740, as shown by the arrow 760. The fluoroscopy-based 2D pathway 740 reflects the path of one or more radiopaque portions of the intravascular device 720 as it moved through the patient vasculature as observed from the angle 790 by the x-ray imaging device 152. The fluoroscopy-based 2D pathway 740 defines the path as measured by the x-ray device which acquired the fluoroscopy images 710, and therefore shows the path from the same angle 790 at which the fluoroscopy images were acquired. Stated differently, the 2D pathway 740 describes the projection of the 3D path followed by the device onto the imaging plane at the imaging angle 790. In some embodiments, the pathway 740 may be determined by an average of the detected locations of the intravascular device 720 in the fluoroscopy images 710. For example, the pathway 740 may not coincide exactly with the guidewire in any fluoroscopy image 710 selected for presentation.

As shown by the arrow 762, because the two-dimensional path 740 is generated based on the fluoroscopy images 710, each position along the two-dimensional path 740 may be associated with one or more fluoroscopy images 710. As an example, at a location 741 along the path 740, the first fluoroscopy image 710 may depict the intravascular device 720 at that same position 741. In addition, because a correspondence was also established between the fluoroscopy images 710 and the intravascular data 730 as shown by the arrow 761, intravascular data 730, such as the first IVUS image shown, may also be associated with the location 741 along the path 740 as shown by the arrow 763.

Finally, the path 740 generated based on the locations of the intravascular device 720 within the fluoroscopy images 710 may be overlaid onto any suitable fluoroscopy image 711 (e.g., one of the fluoroscopic images 710 in the fluoroscopic image stream). In this way, any location along the path 740 displayed on the fluoroscopy image 711 may be associated with IVUS data such as an IVUS image 730, as shown by the arrow 764. For example, IVUS image 730 shown in FIG. 7 may be acquired simultaneously with the fluoroscopy image 710 shown and the two may be associated with each other as shown by the arrow 761. The fluoroscopy image 710 may then indicate the location of the intravascular device 720 along the path 740, as shown by the arrow 762, thus associating the IVUS image 730 with the location 741 along the path 740 as shown by the arrow 763. Finally, the IVUS image 730 may be associated with the location within the fluoroscopy image 710 at which it was acquired by overlaying the path 740 with associated data on the fluoroscopy image 711. The pathway 740 itself may or may not be displayed on the image 711.

In the illustrated embodiment of FIG. 7, the co-registered IVUS images are associated with one of the fluoroscopic images obtained without contrast such that that the position at which the IVUS images are obtained is known relative to locations along the guidewire. In other embodiments, the co-registered IVUS images are associated with an x-ray image obtained with contrast (in which the vessel is visible) such that that the position at which the IVUS images are obtained is known relative to locations along the vessel.

Figure 8:
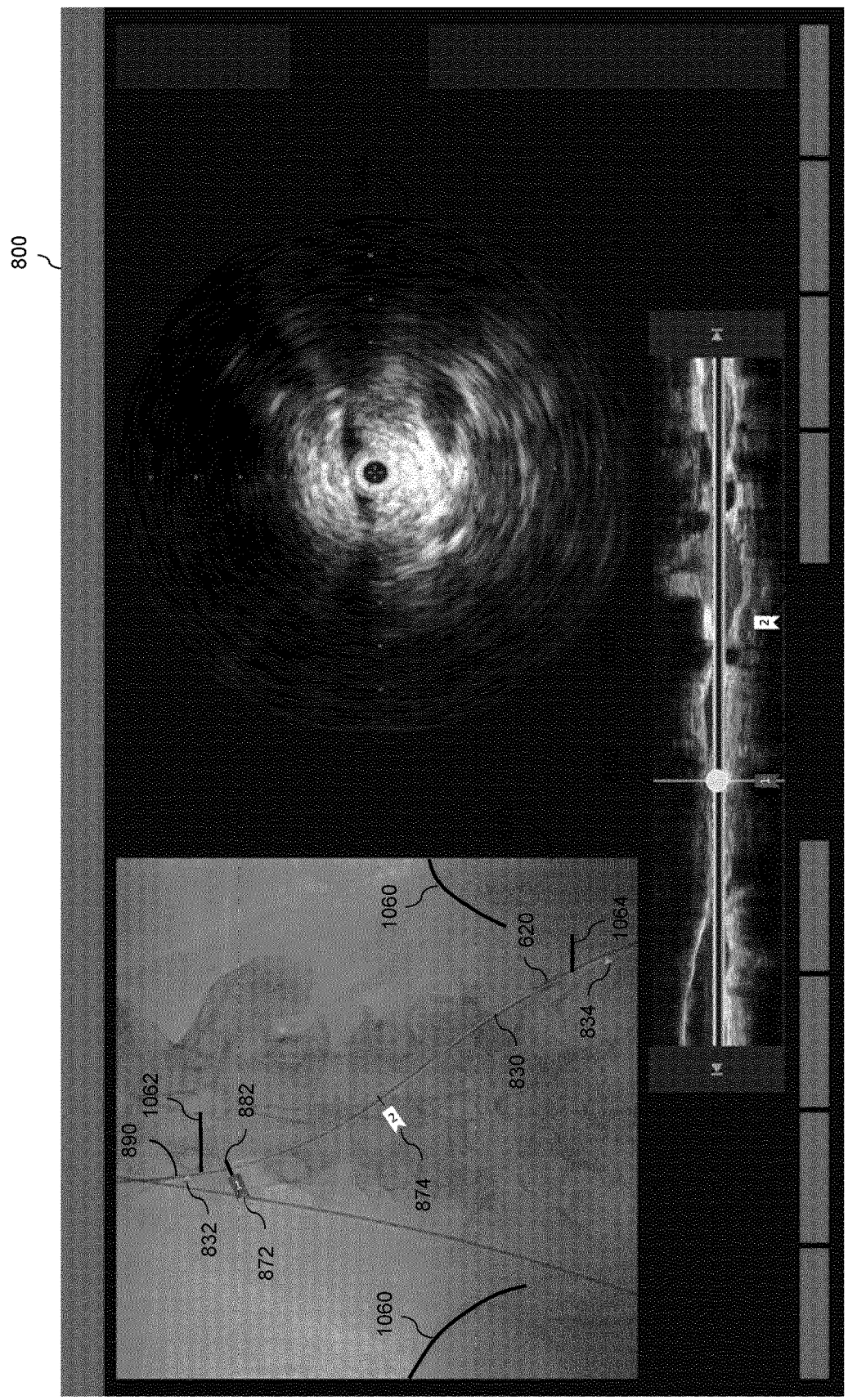
FIG. 8 is a diagrammatic view of a graphical user interface displaying an intravascular image coregistered to an x-ray image, according to aspects of the present disclosure.

FIG. 8 is a diagrammatic view of a graphical user interface 800 displaying an intravascular image 840 coregistered to an x-ray image 810, according to aspects of the present disclosure. The graphical user interface 800 may include an x-ray image 810, an IVUS image 840, and a longitudinal view 850 of the vessel. The longitudinal view 850 can be an ILD, such as an in line digital or image longitudinal display.

The x-ray image 810 may be displayed to a user of the system 100 within the graphical user interface 800. The x-ray image 810 may be acquired with the x-ray imaging system 151 and may be received by the processor 134 of the system 100 (FIG. 1). Similar to the image 800, the x-ray image 800 may be an x-ray image acquired during an imaging procedure in which no contrast agent is added to the patient vasculature. The image 810 may be one of many x-ray images acquired in a continuous image stream. The x-ray image 810 may be an x-ray fluoroscopy image. In other embodiments, different types of x-ray images may be used. The x-ray image 810 provides the user with a view of a region of the patient anatomy through which the intravascular device 620 moved during an imaging procedure.

In some embodiments, the x-ray image 810 shown in the interface 800 is one of the x-ray images obtained by the x-ray imaging system 151 during the IVUS pullback procedure. In other embodiments, however, the x-ray image 810 may not be one of the x-ray images obtained during the pullback procedure. For example, the x-ray image 810 may be any suitable image acquired of the same region of the patient with a guidewire positioned within the same vessel imaged. In such an embodiment, the x-ray image 810 may be acquired from a similar angle as the x-ray images acquired during the procedure such that the shape, placement, orientation, and general appearance of the guidewire within the image 810 is similar to the pathway defined by the movement of the intravascular device 620 during the imaging procedure.

The system 100 may receive from the x-ray imaging system 151 a plurality of x-ray images. Some of these images may have been acquired as the pullback procedure was performed. In other words, some of the received x-ray images may have been received while the intravascular device 620 was acquiring IVUS images. However, some x-ray images received may not have been acquired during the pullback procedure. Rather, some may have been acquired before or after the pullback procedure.

In some embodiments, the x-ray image 810 may include a depiction of a radiopaque portion of the intravascular device 620, as shown in FIG. 8. Because the intravascular device 620 is constructed of radiopaque material, it may be visible in the image 810 acquired without contrast agent. For example, the portion of the intravascular device 620 that is visible in the x-ray image 810 can be the imaging assembly (e.g., transducer assembly) and/or radiopaque markers.

The image 810 may additionally depict one or more guidewires 890. The guidewire 890 may be constructed of radiopaque material such that it appears within the x-ray image 810. Because the guidewire 890 is positioned within the lumen to be imaged, it indicates the location of the vessel within the image 810. Any suitable number of guidewires 890 may be displayed within an x-ray image. For example, two guidewires 890 are shown within the image 810. Additional guidewires 890 may also be present.

The graphical user interface 800 may correspond to a display presented to the user of the system 100 during or after a pullback procedure. A pullback procedure may include an imaging procedure in which the intravascular device 620 is moved through the patient anatomy along the guidewire 890 within a lumen while the x-ray imaging system 151 simultaneously acquires fluoroscopy images of the same region of the patient anatomy without contrast agent inside the vessel. The marker 834 within the fluoroscopy image 810 may indicate a starting position of the intravascular device 620 at the beginning of the pullback procedure. For example, the marker 834 may identify the location along the guidewire 890 at which the first IVUS image was obtained during the pullback imaging procedure. Similarly, the marker 832 may indicate an ending position of the intravascular device 620 at the end of the pullback procedure. For example, the marker 934 may identify the location along the guidewire 890 at which the first IVUS image was obtained during the pullback imaging procedure. In this example, the pullback procedure may include moving the intravascular device 620 through the vessel from a location represented by the marker 834 to the location represented by the marker 832 while the device 620 acquires intravascular data. The system 100 can, e.g., automatically track movement of the radiopaque portion of the device 620 in the plurality of x-ray images acquired as the device 620 moves within the vessel. The intravascular device 620 may move from a distal location within a vessel to a proximal location, as described, or it may move in the opposite direction. For example, the marker 832 may indicate a starting location of the device 620 and the marker 834 may indicate an ending location.

A pathway 830 is also shown overlaid over the x-ray image 810. The pathway 830 may be similar to the pathway 630 described with reference to FIG. 6 or the pathway 740 described with reference to FIG. 7. For example, the pathway 830 may be determined and generated by the system 100 based on the locations of the radiopaque portion of the intravascular device 620 within the x-ray images acquired by the x-ray imaging system 151. The location of the device 620 may be determined by the system 100 using any above-mentioned image processing or deep learning techniques for each acquired x-ray image. These locations may together define the shape of the pathway 830 overlaid over the image 810. In this way, the length or trajectory of the pathway 830 shown on the image 810 may correspond to the length or trajectory along the vessel which was imaged by the intravascular device 620. Because the imaging device 620 moved along the guidewire 890, this pathway 830 is similar in shape to the corresponding section of the guidewire 890 representative of the imaged vessel. In some embodiments, the pathway 830 may not be shown. Indeed, any of the pathway 830 and the indicators 832 and 834 may not be displayed to the user within the graphical user interface 800. In addition, any of the pathway 830 and indicators 832 and 834 may appear differently than they appear in FIG. 8.

In some embodiments, the processor circuit of the system 100 may use some or a subset of the plurality of x-ray images received by the system during the pullback procedure to determine the path 830 of movement of the intravascular device 620 and/or co-registration of intravascular data to corresponding locations within the x-ray image 810. In some embodiments, all of the plurality of x-ray images received are used by the processor circuit to determine the path 830 and complete the coregistration. However, some of the x-ray images acquired may not depict the radiopaque portion of the device 620 or may have been acquired at a time when the device 620 was not acquiring IVUS images.

The process of coregistering intravascular data to locations within the x-ray image 810 along the guidewire 890 may include first co-registering the data to the pathway 830. For example, as explained with reference to FIG. 7, the plurality of IVUS images acquired by the device 620 may be coregistered to locations along the pathway 740. With reference to FIG. 8, using similar techniques, the acquired IVUS images may be coregistered to the pathway 830 shown in the interface 800. The pathway 830 is overlaid over the x-ray image 810 at the same location as the guidewire 890. Because the pathway 830 is of the same shape as the guidewire 890 such that the pathway 830 aligns with the guidewire 890 throughout the length of imaged region of the vessel, the intravascular data that was coregistered to the pathway 830 may be additionally coregistered to the guidewire 890. As a result, the pathway 830 may be displayed or may not be. The indicator 882 may be displayed with relation to the guidewire 890 without the pathway 830 being displayed.

The image 810 may include an indicator 882. The graphical user interface 800 additionally includes the IVUS image 840 displayed adjacent to the x-ray image 810. The indicator 882 may identify to the user of the system 100 the location along the guidewire 890 or pathway 830 at which the IVUS image 840 was obtained. Because the guidewire 890 is positioned within the imaged vessel, as the indicator 882 is displayed along the guidewire 890, it also identifies to the user the location along the imaged vessel at which the IVUS image 840 was acquired. Thus, even though the vessel cannot be directly visualized because the x-ray images were obtained without contrast, registration of the IVUS image to a corresponding location along the vessel is still possible because the guidewire 890 acts as the vessel. The indicator 882 is disposed along the guidewire 890, not the vessel, in the x-ray image 810 at a corresponding position of the IVUS image 840.

The indicator 882 may be of any suitable appearance and may be positioned at any suitable location relative to the guidewire 890. For example, the indicator 882 may be a single solid line, as shown. Alternatively, the indicator 882 may be of any suitable shape, profile, color, pattern, weight, or other appearance. The indicator 882 may be positioned overlaid on the guidewire 890 or the pathway 830 or may be positioned elsewhere. For example, the indicator 882 may be positioned adjacent to the guidewire 890 or the pathway 830. The indicator 882 may be positioned along an axis perpendicular to the guidewire 890 or the pathway 830 and spaced from the guidewire 890 or pathway 830 or positioned in any other location so as to indicate the location along the guidewire 890 or pathway 830 the location at which the IVUS image 840 was acquired. All or part of the indicator 882 may be positioned over the guidewire 890, adjacent to the guidewire 890, proximate to the guidewire 890, spaced from the guidewire 890, or combinations thereof. The indicator 882 may also be referred to as a marker, marking, identifier, scrubber, pointer, or any other suitable term.

Earlier coregistration systems required a roadmap x-ray image of a vessel that is obtained with contrast. The locations of coregistered IVUS images were displayed in the roadmap image relative to the contrast-filled vessel in these earlier systems. This required more time for the procedure because the contrast had to be introduced into the vessel and the x-ray image with contrast had to be taken. The present disclosure advantageously avoids the prolongation of the IVUS imaging procedure caused with the contrast and the potential patient discomfort associated with this delay and/or the contrast itself. In addition, some patients may be sensitive to radiopaque contrast due to various conditions, such as impaired kidney function. Avoiding radiopaque contrast in such situations is clinically advantageous because it avoids risk of harm to the patient. In particular, the roadmap x-ray image 810 in the present disclosure does not have to be obtained with contrast or have a contrast-filled vessel. Rather, the roadmap x-ray image 810 can be obtained without contrast because the guidewire 890 that is positioned within the vessel is visible in the roadmap x-ray image. The marker or marking 882 is displayed relative to the guidewire 890, not the vessel.

The graphical user interface 800 additionally depicts an ILD 850. The IVUS images acquired with the device 620, may be used to create an ILD 850, shown adjacent to the IVUS image 840. In that regard, IVUS image 840 is a tomographic or radial cross-sectional view of the blood vessel. The ILD 850 provides a longitudinal cross-sectional view of the blood vessel. The ILD 850 can be a stack of the IVUS images acquired at various positions along the vessel, such that the longitudinal view of the ILD 850 is perpendicular to the radial cross-sectional view of the IVUS image 840. In such an embodiment, the ILD 850 may show the length of the vessel, whereas an individual IVUS image 840 is a single radial cross-sectional image at a given location along the length. In another embodiment, the ILD 850 may be a stack of the IVUS images acquired overtime during the imaging procedure and the length of the ILD 850 may represent time or duration of the imaging procedure. The ILD 850 may be generated and displayed in real time or near real time during the pullback procedure. As each additional IVUS image 840 is acquired by the device 620, it may be added to the ILD 850. For example, at a point in time during the pullback procedure, the ILD 850 shown in FIG. 8 may be partially complete. In some embodiments, the processor circuit may generate an illustration of a longitudinal view of the vessel being imaged based on the received IVUS images. For example, rather than displaying actual vessel image data as the ILD 850 does, the illustration may be a stylized version of the vessel, with e.g., continuous lines showing the lumen border and vessel border. The ILD 850 may include an indicator 862. The indicator 862 may indicate to the user the location along the ILD 850 at which the IVUS image 840 was obtained. The indicator 862 may therefore correspond to the indicator 882. In some embodiments, the processor circuit may move the indicator 882 from one location along the guidewire 890 to another in response to a user input designating the new location. As the indicator 882 is moved to a different location, the indicator 862 may be moved to the corresponding location along the ILD 850 and the IVUS image acquired at the location may be displayed. In this way, the location at which the IVUS image shown in the graphical user interface 800 may be shown within the x-ray image 810 by the indicator 882 and within the ILD 850 by the indicator 862. Similarly, if the processor circuit moves the indicator 862 within the ILD 850 in response to a user input, the indicator 882 may move to the corresponding location along the guidewire 890 within the image 810 and the IVUS image acquired at that new location may be displayed.

The processor circuit may move the indicator 882 by any suitable method or in response to any type of user input. For example, the user may use a mouse to click on a location along the guidewire 890, may touch a location along the guidewire 890 using a touchscreen device, or may indicate the new location by any other way. For example, the user may input any commands to the system 100 via a mouse, a mouse click, cursor, pointer, joystick, physical button, pressure of depressing a physical button, a control pad, finger or touch of the finger on a screen, with a stylus or touch of a stylus on a screen, or by any other means. Whatever the input device, the input device may be positioned proximate to or spaced from the patient. For example, the input device could be a bedside controller coupled to a rail of a bed or table upon which the patient is positioned. The input device may be in a control room separate from the patient and proximate to the procedure room. In some embodiments, the user may select and drag the indicator 882 to a different location along the guidewire 890. Similarly, the user may move the indicator 862 to different locations along the ILD 850 by any of these methods as well.

The indicator 862 displayed on the ILD 850 may be of any suitable appearance or positioned at any suitable location. For example, the indicator 862 may include a line extending perpendicularly across the ILD 850 as shown. The indicator 862 may include any suitable shape, such as a circle positioned at a central point along the line as shown. In other embodiments, the indicator may be of any pattern, weight, color, shape, profile, or any other appearance. The indicator 862 may be positioned over the ILD 850 as shown, or may be positioned next to the ILD 850 or positioned at any other suitable location so as to indicate the location along the ILD 850 at which the corresponding IVUS image shown was acquired.

The indicator 882 and/or the indicator 862 may alternatively be referred to by any suitable term, including but not limited to a scrubber, marker, marking, pointer, or by any other suitable term.

The x-ray image 810 may additionally include one or more annotations including the bookmarks 872, 874, 876, and 878, and annotations 1060, 1062, and 1064. The bookmarks 872, 874, 876, and 878, as well as annotations 1062, 1064, and 1060 may alternatively be referred to as markers. During or after an imaging procedure, the processor circuit of the system 100 may create annotations related to the acquired data in response to a user input. The annotations created may include any information, including text, symbols, images, or any other content. The annotations may identify regions of interest along the imaged vessel in the x-ray image. Annotations may mark IVUS images. For example, one of the IVUS images may display a region along the imaged vessel with greatest constriction, a minimum lumen area and/or maximal venous compression, a minimum lumen diameter, a proximal landing zone (e.g., healthy tissues proximal of the blood flow constriction) for the proximal stent edge, a distal landing zone (e.g., healthy tissue distal of the blood flow constriction) for the distal stent edge, location where two vessels join together or split apart, etc. The user may wish to identify an image to be easily located again. Annotations may identify or highlight sections of an IVUS image, an x-ray image, or the ILD 850.

In some embodiments, annotations may include bookmarks. In an embodiment in which a feature of interest is observed by the user of the system 100 within an IVUS image, the processor circuit may create a bookmark corresponding to the image in response to a user input identifying a location or image. For example, in FIG. 8, the user may wish to identify the IVUS image 840 shown with a bookmark. The image 840 may identify an occlusion within the vessel or some other feature of interest, such as a venous compression, for example. The user input received by the processor circuit may indicate to the processor circuit to generate a bookmark related to the image 840. The user input may be of any suitable type, including those previously described. For example, the user input may be a selection of the buttons 860 within the interface 800 to create a bookmark. After the IVUS image 840 is identified, a bookmark 876 may be positioned along the ILD 850. This bookmark 876 may identify where along the ILD 850 the identified image 840 is located within the vessel. As the indicators 862 and 882 are moved to different locations, the bookmark 876 may remain at the same location along the ILD 850. A user of the system 100 may then select the bookmark 876 to quickly move the indicator 862 to the same location as the bookmark 876. This would also cause the previously identified IVUS image 840 to be displayed within the interface 800.

An additional bookmark 872 may be placed within the x-ray image 810 corresponding to the bookmark 876. Just as the indicator 882 in the x-ray image 810 corresponds to the location of the indicator 862 in the ILD 850, the bookmark 872 may identify the location along the guidewire 890 at which the bookmarked image 840 was acquired. Similarly, a user may select the bookmark 872. The indicator 882 may move to the location of the bookmark 872. The indicator 862 may also move to the location of the bookmark 876 on the ILD 850 and the IVUS image 840 may be displayed.

The bookmark 872 may be a graphical representation overlaid on the x-ray image 810. The processor circuit may generate and display the bookmark 872 in response to a user input designating the location along the guidewire 890. The bookmark 872 may be of any suitable appearance and be positioned at any suitable location with regard to the x-ray image 810. For example, the bookmark 872 may be of any suitable shape, color, pattern, or size, and may include any alphanumeric text. In one embodiment, the bookmark 872 may include a flag with a numeral. The numeral may correspond to the order in which the bookmark 872 was created by the processor circuit in relation to other generated bookmarks. The bookmark 872 may include any other suitable text describing the bookmark 872, the location at which the bookmark 872 is positioned, or any other features of the patient anatomy. The bookmark 872 may be positioned to the side of the guidewire 890 as shown. The bookmark 872 may be positioned at some location spaced from the guidewire 890. The bookmark 872 may also be positioned adjacent to the indicator 882. In some embodiments, the bookmark 872 may overlap or be positioned directly next to the indicator 882. The bookmark 872 may also be at any other suitable location, including proximate to, adjacent to, or overlapping the guidewire 890. Any of the indicator 874, 876, 878, 1060, or 1062 may be similar to the indicator 872.

The processor circuit may generate any of the bookmarks 872, 874, 876, and/or 878 or similar markers within the graphical user interface 800 which may be used to identify any suitable structures or features within the image 810, the IVUS image 840 or the ILD 850. In some applications, any of these bookmarks may identify a treatment region including a start and end of a treatment region, or a beginning or an ending. Additionally, these bookmarks could identify a proximal or distal end of a treatment device or a treatment region or a region imaged during an imaging procedure.

In some embodiments, the system 100 may identify IVUS images of interest automatically. For example, the system 100 may perform various deep learning techniques to analyze each acquired IVUS image to identify features of interest. The system 100 may identify an IVUS image acquired along the imaged vessel showing an occlusion, a lesion, a planned landing zone, or any other relevant feature. When the system 100 identifies an IVUS image of interest, it may similarly create a bookmark 878 along the ILD 850. The bookmark 878 may be similar to the bookmark 876 in that it may identify where along the ILD 850 the automatically identified IVUS image is located within the vessel. As the user navigates to different IVUS images, the bookmark 878 may remain at the same location. The user may then select the bookmark 878 to quickly move the indicator 862 to the same location along the ILD 850 and cause the automatically identified IVUS image to be displayed. In some aspects, the system 100 may automatically identify and create bookmarks relating to IVUS images using some features similar to those described in U.S. Publication No. 2020/0129148, titled "Intraluminal Ultrasound Imaging with Automatic and Assisted Labels And Bookmarks," and U.S. Provisional Application No. 62/969,857, filed Feb. 4, 2020, and titled "Automatic Intraluminal Imaging-Based Target and Reference Image Frame Detection and Associated Devices, Systems, and Methods," each of which is hereby incorporated by reference in its entirety.

A similar relationship may exist between the bookmarks 878 and 874 as the bookmarks 876 and 872. The bookmark 874 may be placed automatically within the x-ray image 810 corresponding to the bookmark 878 and may identify the location along the guidewire 890 at which the automatically identified IVUS image was acquired.

The bookmarks 872, 874, 876, and 878 may be of any suitable appearance. For example, they may include various shapes, patterns, colors, text, or numbers. In some embodiments, bookmarks that are manually created may be of one appearance and automatically created bookmarks may be of another. For example, bookmarks that are created manually by the user may be of one color while automatically created bookmarks are of a different color. In some embodiments, the appearance of the bookmarks may be determined by the user and adjusted in real time or near real time to reflect various features or attributes of the identified IVUS images and their corresponding locations along the guidewire 890 and/or the ILD 850. The bookmarks 872, 874, 876, and 878 may also be referred to as indicators, markings, markers, or any other suitable term.

In some embodiments, the user may create bookmarks based on features identified within the x-ray image 810 and may create bookmarks directly within the image. For example, the user may identify locations along the imaged vessel that are near to other anatomical features within the patient, such as near structures such as bones or ligaments.

The system 100 may create bookmarks along the ILD 850 corresponding to the bookmarks created within the x-ray image 810. The system 100 may also identify the IVUS image acquired at a location closest to the location of the created bookmark.

Similarly, a user may create bookmarks based on features of the ILD 850. These bookmarks may similarly cause the system 100 to create corresponding bookmarks in corresponding locations along the guidewire 890 of the x-ray image 810 and identify the IVUS image acquired at a location closest to the location of the created bookmark.

In some embodiments, the processor circuit may generate additional annotations within the x-ray image 810, the IVUS image 840, and/or the ILD 850 in response to a user input. For example, the processor circuit may generate annotations 1062 and 1064. The annotations 1062, 1064 indicate locations of interest of the vessel that are positioned along the guidewire 890. For example, the annotations 1062, 1064 may define the region of the vessel that the physician wants to treat. In such an embodiment, annotations 1062, 1064 may mark the distal extent or proximal extent of the treatment region. For example, when the treatment is peripheral venous stenting, the annotations 1062 and 1064 may identify locations along the guidewire 890 of landing zones for a balloon or stent. For example, the annotation 1064 may identify a distal landing zone and the annotation 1062 may identify a proximal landing zone. The locations of the annotations 1062 and 1064 may be determined by the user manually based on, e.g., the IVUS images, the x-ray image 810, etc. In some embodiments, the system 100 may also automatically identify or recommend locations for stent landing zones. Similar to the bookmarks 872, 874, 876, and 878, the annotations 1062 and 1064 may be of any suitable appearance. For example, they may be or include any suitable color, shape, pattern, alphanumeric text, or any other graphical representations. The appearance of the annotations 1062, 1064, and/or 1060 may be determined by the user. They may be a line, curve, closed shape, polygon, ellipse, circle, or any other suitable shape or profile.

The user may create additional annotations such as annotations 1060. The annotations 1060 may identify any suitable anatomical structures shown in the x-ray image 810. For example, the annotations 1060 in the x-ray image 810 may identify a pelvic bone structure. Annotations 1060 may identify other structures such as various vertebrae, the lesser trochanter, or other bone structures. The annotations 1060 may also indicate vessel structures such as the confluence between two vessels or locations along the vessel with occlusions and/or maximal compression. Any of the structures may be identified in interventional peripheral procedures such as interventional peripheral venous procedures or any other procedures.

The annotations 1060 and/or 1062 may be pre-defined shapes or may be drawn by the user. For example, the system 100 may provide the user with various shapes to choose to position in relation to the x-ray image 810. The system 100 may alternatively or additionally generate custom shapes in response to a user input. The annotations 1060 and/or 1062 may be positioned anywhere in the x-ray image. The location of the annotations can be stored in the memory. These locations may be identified any/or stored as pixel coordinates relative to the x-ray image as a whole or in relation to the guidewire.

Figure 9:
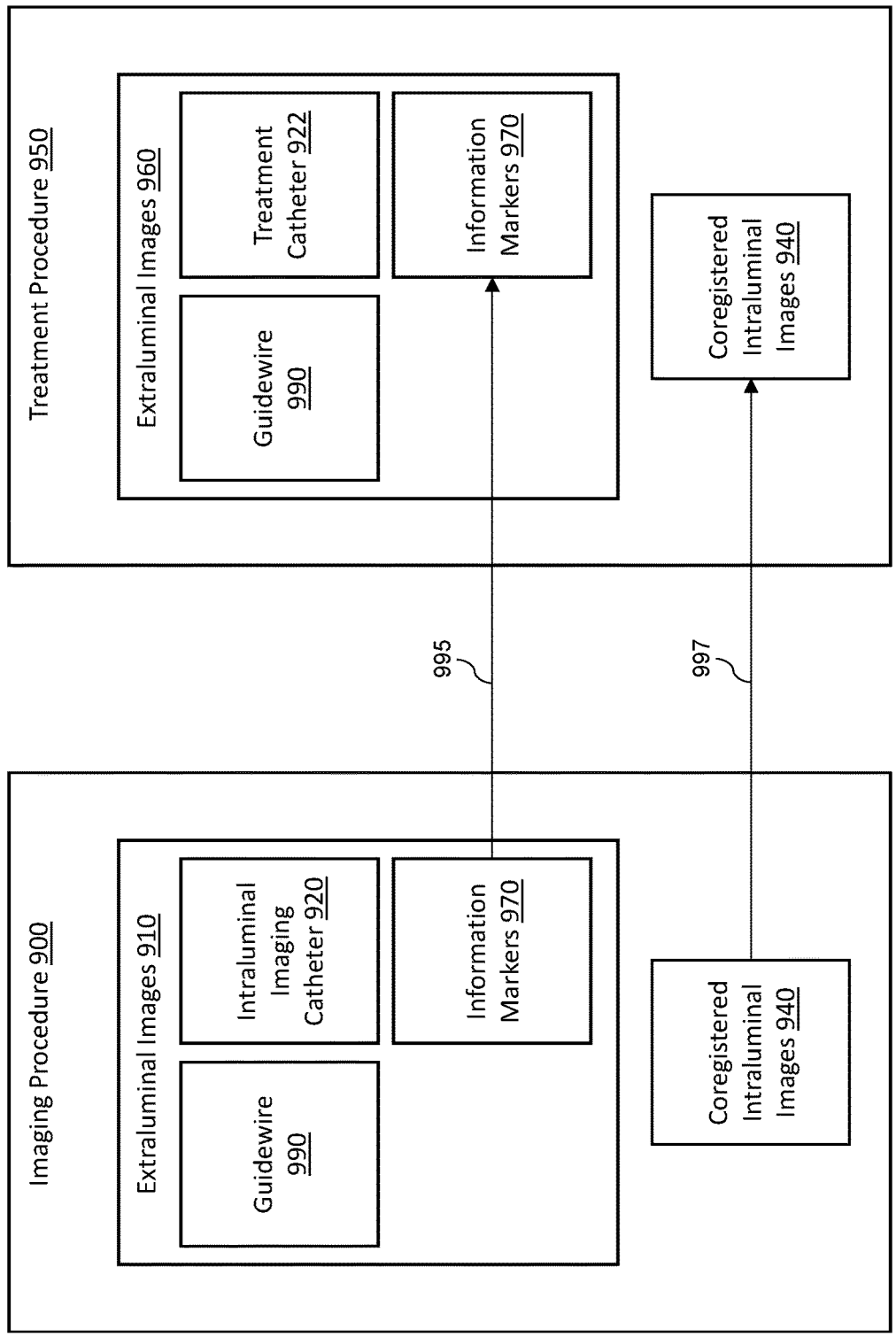
FIG. 9 is a schematic diagram of an imaging procedure and a treatment procedure, according to aspects of the present disclosure.

FIG. 9 is a schematic diagram of an imaging procedure 900 and a treatment procedure 950, according to aspects of the present disclosure. For example, FIG. 9 includes a representation of images obtained and displayed during an imaging procedure 900 as well as images obtained and displayed during a subsequent related treatment procedure 950. In some embodiments, the imaging procedure 900 is an imaging phase of a catheterization procedure, and the treatment procedure 950 is a treatment phase of the same catheter lab session.

During an imaging procedure 900, multiple extraluminal images 910 may be obtained. These extraluminal images 910 may be x-ray images. The images 910 may be acquired with the x-ray imaging system 151 (FIG. 1). Any of the extraluminal images 910 may be substantially similar to the x-ray image 810 shown in FIG. 8. The extraluminal images 910 may be obtained while an intravascular imaging device, such as the device 102 (FIG. 1) or 620 (FIG. 6) is moved through a vessel of the patient. The extraluminal images 910 may include any of the guidewire 990, the intraluminal imaging catheter 920, and information markers 970.

As previously described, prior to an imaging procedure, a guidewire 930 may be positioned within the vessel of the patient to be imaged. The guidewire 990 may be substantially similar to the guidewire 890 shown in FIG. 8. The guidewire 990 may be constructed of a radiopaque material. The guidewire 990 may, therefore, appear within the extraluminal images 910.

Similar to the device 102 (FIG. 1) and/or 620 (FIG. 6), the intraluminal imaging catheter 920 may appear within the extraluminal images 910. The intraluminal imaging catheter 920 may be constructed of a radiopaque material. As the intraluminal imaging catheter 920 moves along the guidewire 990 and through the vessel, multiple extraluminal images 910 may be acquired. As a result, the intraluminal imaging catheter 920 may be observed in different locations within different extraluminal images 910. As described with reference to FIG. 7, the locations of the catheter 920 within the extraluminal images 910 may determine a pathway of the catheter 920 similar to the pathways 830 (FIG. 8) or 740 (FIG. 7). Because the catheter 920 is positioned on the guidewire 990, the catheter 920 may be observed to be positioned along the guidewire 990 in every acquired extraluminal image 910.

Any of the acquired extraluminal images 910 may additionally include information markers 970. The information markers 970 may include indicators such as the bookmarks 872 or 874 described with reference to FIG. 8. The information markers 970 may additionally include indicators 1062 and 1064 and/or indicators 1060 of FIG. 8. The information markers 970 may include additional graphical representations. The information markers 970 may be created by the user of the system 100 or by the system 100 automatically as explained. They may identify locations of interest along the guidewire 990 or vessel or may identify any other suitable areas or structures of interest within any of the extraluminal images 910. In some embodiments, the information markers 970 may also include graphical representations of the beginning and/or end points of treatment zones, distal or proximal landing zones of treatment devices, or may serve any other purpose.

The imaging procedure 900 may include multiple coregistered intraluminal images 940. These images 940 may be acquired by the intraluminal imaging catheter 920. The images 940 may be acquired at the same time the extraluminal images 910. In this way, as explained with reference to FIG. 7, the intraluminal images 940 may be coregistered to the locations at which they were obtained within one of the extraluminal images 910. The intraluminal images 940 may be coregistered to locations as shown by the guidewire 990 within the extraluminal images 910. In some embodiments, the intraluminal images 940 may be IVUS images.

After the imaging procedure 900, the intraluminal imaging catheter 920 may be removed from the vessel of the patient. However, the guidewire 990 may be left within the vessel such that the guidewire 990 remains in the same position, shape, and/or orientation within the vessel. While the guidewire 990 is left within the vessel, the user of the system 100 or the physician may conduct a treatment procedure 950. The treatment procedure 950 may include the placement of a treatment device, such as a stent, within the vessel just imaged during the imaging procedure 900. The treatment procedure 950 may include the deploying a stent, balloon for angioplasty, cryotherapy device, ablation device, drug delivery device, or any other treatment device or substance. The treatment device is moved along the guidewire through the vessel during placement.

As shown in FIG. 9, the treatment procedure 950 may include acquiring multiple extraluminal images 960. The patient may remain stationary between the imaging procedure 900 and the treatment procedure 950. In addition, the c-arm projection angles and field of view (FOV) of the x-ray imaging device may also remain the same. As a result, the extraluminal imaging system used to acquire the extraluminal images 910 may be used to acquire the extraluminal images 960. The extraluminal images 960 may, therefore, show the same region of the patient anatomy as was displayed in the extraluminal images 910.

The extraluminal images 960 may depict the same guidewire 990. Because the guidewire 990 is not removed from the patient between the imaging procedure 900 and the treatment procedure 950, the same guidewire 990 may appear in both the extraluminal images 910 and the extraluminal images 960. The guidewire 990 may be of the same position, shape, or orientation in both the images 910 and 960 because the patient was not moved. In other words, the patient, the guidewire 890, and the x-ray imaging system 151 may be in the same arrangement, position, pose, or orientation.

The extraluminal images 960 are different than the extraluminal images 910. For example, the extraluminal images 960 are obtained later in time than the extraluminal images 910. In that regard, the imaging procedure 900 occurs earlier in time than the treatment procedure 950. The extraluminal images 960 are acquired contemporaneously during the treatment procedure 950, whereas the extraluminal images 910 were acquired contemporaneously during the imaging procedure. For example, the extraluminal imagines 960 do not depict the intraluminal imaging catheter 920 because the catheter 920 was removed from the patient anatomy after the imaging procedure 900. Similar to the extraluminal images 910, however, the extraluminal images 960 obtained during the treatment procedure 950 may also be obtained without contrast introduced to the patient vasculature. As a result, though vessels within the patient anatomy may not be visible within the extraluminal images 960, radiopaque portions of the guidewire 990 and treatment catheter 922 are visible within the extraluminal images 960. For example, the extraluminal images 960 may display a treatment catheter 922. The treatment catheter 922 may be used to position a treatment device at a location within the patient vessel. In some embodiments, the treatment device may be the treatment catheter itself. In some embodiments, the treatment device may be an active component at the distal end of the catheter 922. For example, the treatment device can be a component removably coupled to the catheter 922 (e.g. a stent, medicine, etc.). For example, the catheter 922 can be a treatment delivery catheter. In some embodiments, the extraluminal imaging system may continuously acquire extraluminal images 960 so that the movement of the treatment catheter 922 may be displayed in real time or near real time. In this way, as the treatment catheter 922 moves in a distal direction, for example, the movement of the catheter 922 may be observed within the continuous stream of extraluminal images 960 that is displayed.

The extraluminal images 960 displayed to the user may also include the same informational markers 970 as were generated with the images 910 during the imaging procedure. These markers 970 may identify locations such as distal and proximal landing zones for the treatment device. For example, the treatment catheter 922 may be positioned at the proper location along the vessel such that the device's distal end is positioned at the distal landing zone and the proximal end is positioned at the proximal landing zone. The information markers 970 shown within the continuous stream of extraluminal images 960 may guide to the placement of the treatment catheter 922 at the correct location. Similarly, any other information marker 970, such as bookmarks or annotations may be displayed on the extraluminal images 960 to further assist or orient the user. Because the extraluminal images 960 may be displayed as a continuous stream, the informational markers may be displayed at the same location in each displayed extraluminal image 960.

In some embodiments, during a treatment procedure, the user may also wish to view intraluminal images of locations along the vessel. Because the coregistered intraluminal images 940 were coregistered to locations along the guidewire 990, and because the guidewire 990 is visible within the extraluminal images 960, the system may identify the locations of the intraluminal images 940 along the guidewire 990 in the extraluminal images 960. So, if during a treatment procedure, the user wishes to view an intraluminal image of a location of a landing zone, the processor circuit may display an intraluminal image 940 in response to a user input selecting a location along the guidewire 990. It is noted that the processor circuit may identify and display this intraluminal image 940, or any other intraluminal image acquired by the intravascular device, regardless of whether the location selected by the user has been marked, bookmarked, and/or annotated. However, in some circumstances, this location may have been previously marked, bookmarked, and/or annotated and may be identified by one of the information markers 970 also displayed based on annotations generated during the imaging procedure 900. In this manner, the system advantageously intravascular image guidance during the treatment procedure 950 even though the intraluminal imaging catheter 920 is not present. Radiopaque portions of the guidewire 990 are visible in x-ray images. It is further noted, that in some embodiments, the radiopaque nature of the guidewire, or which portions of the guidewire are radiopaque, may depend on the diameter of the guidewire used during the imaging and treatment procedures. For example, all or most of a guidewire of 0.035" diameter may be radiopaque and therefore visible within an x-ray image. However, a guidewire of 0.014" diameter may only be radiopaque at its distal tip. In some embodiments, the radiopaque nature of the guidewire, or which portions of the guidewire are radiopaque, may depend on the material of forming the guidewire. The radiopaque portions may be formed of a radiopaque material. Guidewires of other diameters may be similarly radiopaque depending on their diameter.

The information markers 970, the locations of the information markers 970, the intraluminal images 940, and the locations of the intraluminal images 940 may all be stored in a memory in communication with the processor circuit of the system 100 during the imaging procedure 900. Subsequently, during the treatment procedure 950, the information markers 970, intraluminal images 940 and the corresponding locations of intraluminal images 940 may be recalled by the system 100 as shown by the arrows 995 and 997. These information markers 970 are not initially generated during the treatment procedure 950, but recalled from the imaging procedure 900 and regenerated by the processor circuit during the treatment procedure 950. In some embodiments, the system 100 may initially generate additional information markers 970 during a treatment procedure including any of the bookmarks and/or annotations previously or hereafter described in response to a user input during the treatment procedure 950. In some embodiments, any of the elements displayed in FIG. 9 may be stored within a memory in communication with the processor circuit of the system for later recall either during an imaging procedure 900 or a treatment procedure 950.

Figure 10:
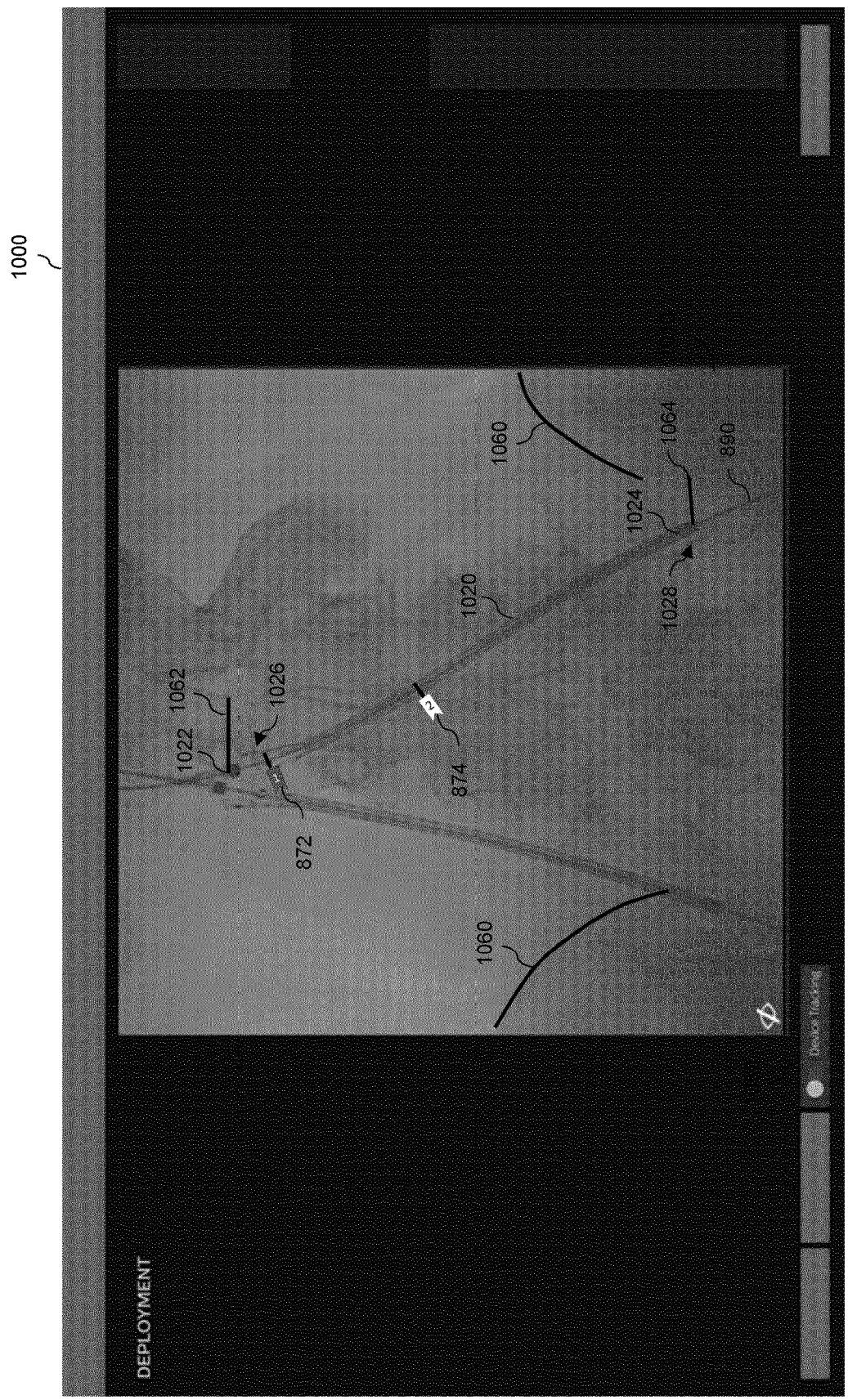
FIG. 10 is a diagrammatic view of a graphical user interface displaying an x-ray image during a treatment procedure, according to aspects of the present disclosure.

FIG. 10 is a diagrammatic view of a graphical user interface 1000 displaying an x-ray image 1010 during a treatment procedure, according to aspects of the present disclosure. FIG. 10 includes the x-ray image 1010 showing the guidewire 890, a treatment device 1020, bookmarks 872 and 874, annotations 1062, 1064, and 1060, and a device tracking indicator 1050.

The x-ray image 1010 shown in FIG. 10 may be an extraluminal image obtained during a treatment procedure. For example, the x-ray image 1010 may be substantially similar to the extraluminal images 960 described with reference to FIG. 9. The x-ray image 1010 may be one of the x-ray images obtained during the treatment procedure. The x-ray images obtained during the treatment procedure, including the x-ray image 1010 may be obtained without contrast. Vessels of the patient may, therefore, not be directly visible within the x-ray image 1010. However, radiopaque portions of the guidewire 890 and treatment devices may be visible. The x-ray image 1010 may be an x-ray image obtained by the x-ray imaging system 151 (FIG. 1). It may depict the same or substantially similar anatomical region as shown in the x-ray image 810 of FIG. 8. For example, after the imaging procedure is completed as described with reference to FIG. 8, the same guidewire 890 may remain in the imaged vessel. After the imaging device 620 is removed from the vessel, a treatment device 1020 may be positioned around the guidewire 890 and inserted into the vessel.

As explained with reference to FIG. 6, during an imaging procedure, an imaging device, such as the device 620 may first be moved in a distal direction along a guidewire and subsequently moved in a proximal direction as intraluminal images are acquired. During a treatment procedure, the treatment device 1020 or the treatment catheter may move in a similar fashion, or may differ. For example, a treatment device such as a stent or angioplasty balloon may be moved in a distal direction to the site at which the device needs to be deployed. Additional movements in either a distal or proximal direction may fine tune the location of the treatment device to the proper location. After deployment, the treatment device, such as a stent, may remain within the vessel as the delivery catheter moves proximally and is removed from the vessel. For an angioplasty balloon, the device may simply expand radially for a period of time prior to being deflated, moved in a proximal direction, and removed.

The x-ray image 1010 may be one of a continuous stream of x-ray images received by the system and displayed to the user. For example, the x-ray image 1010 may be continuously updated with new images received from the x-ray imaging system. As a result, as the user moves the treatment device 1020 along the guidewire, the user may see the movement of the device 1020 on the display shown in the image 1010.

The treatment device 1020 may be any of the devices listed with reference to FIG. 9. In one example, the treatment device 1020 may be a stent. The device 1020 shown in the image 1010 may include a distal region 1028 and a proximal region 1026. The distal region 1028 of the device 1020 may include a radiopaque marker 1024. The radiopaque marker 1024 may identify for the user the distal end of the treatment device 1020. Similarly, the proximal region 1026 may include a radiopaque marker 1022 as well. The radiopaque marker 1022 may identify to the user the proximal end of the treatment device 1020. The radiopaque marker 1022 and/or radiopaque marker 1024 may be coupled to the treatment delivery catheter and/or the treatment device itself. In some embodiments, a treatment device, such as a stent, may be constructed of a radiopaque material such that the entire device is visible within the x-ray image 1010.

The x-ray image 1010 may additionally display the indicators 1062 and 1064. The indicators 1062 and 1064 are the same indicators 1062 and 1064 which the processor circuit generated in response to a user input during the prior imaging procedure as described with reference to FIG. 8. In that example, the indicators 1062 and 1064 may point to landing zones for the treatment device. When the indicators 1062 and 1064 are generated during an imaging procedure, the system 100 may store the location of these indicators in relation to the guidewire 890, as will be discussed hereafter. In this way, the system 100 may display the indicators 1062 and 1064 at the same locations along the guidewire 890 in the x-ray image 1010 as in the image 810 of FIG. 8. The indicators 1062 and 1064 may guide the placement of the treatment device 1020. For example, the radiopaque marker 1024 at the distal region 1028 may be positioned close to the indicator 1064 as shown in FIG. 10. The radiopaque marker 1022 at the proximal region 1026 may be positioned close to the indicator 1062. As a result, the treatment device 1020 may be positioned close to the location chosen during the imaging procedure.

To further assist placement of treatment devices during a treatment procedure, other annotations, such as the annotations 1060 may be displayed within the x-ray image 1010 at their appropriate locations. For example, when the annotations 1060 are generated during an imaging procedure, the system 100 may store these locations and display them on the x-ray image 1010 during a treatment procedure.

In one embodiment, the locations of the annotations 1060, 1062, and 1064, or any other annotations, bookmarks, or markers, may be stored by the system 100 without reference to the guidewire 890. For example, the locations of annotation 1060 may instead by saved as two coordinates (e.g., $X_1$, $Y_1$) corresponding to the pixels within the image 1010 in which the annotations 1010 were created within the image 810. Because the patient is not moved and the c-arm projection angles and FOV of the x-ray imaging system 151 remain consistent between the imaging procedure and the treatment procedure and because the image sizes of the x-ray images during imaging and treatment can be the same or proportional, the locations of pixels of the annotation 1060 within the image 810 may match the locations of pixels of the annotations 1060 within the image 1010. For example, if the size of the x-ray images obtained during the imaging procedure is the same as the size of the x-ray images obtained during the treatment procedure, then a two-coordinate pixel position (e.g., $X_1$, $Y_1$) from an x-ray image obtained during the image phase is the same during the treatment phase. In an example in which the size of the x-ray images are not the same, but proportional, the stored two-coordinate pixel positions from an imaging procedure may be multiplied by some proportionality factor. For example, if the coordinates from the imaging procedure could be ($X_1$, $Y_1$) and the coordinates for the treatment procedure could be ($kX_1$, $kY_1$), where k is a proportionality factor. The locations of any other annotations may be stored with a similar method.

In some embodiments, the x-ray images obtained during the imaging procedure may be the of the same size as the x-ray images obtained during the treatment procedure. However, the images of the treatment procedure may exhibit a constant shift of several pixels in a certain direction. In such an embodiment, the identification of features of interest such as bone or vessel structures may be observed by the user during the treatment phase and may be corrected or modified accordingly. For example, if the coordinates from the imaging procedure could be ($X_1$, $Y_1$) and the coordinates for the treatment procedure could be ($X_1+r$, $Y_1+r$), where r accounts for the observed constant shift.

In some embodiments, the locations of the indicators 1060, 1062, and/or 1064 may be stored in relation to the guidewire 890. For example, the processor circuit may define a coordinate system of the guidewire 890. The coordinate space defined by the guidewire 890 can include one axis that is a position along the guidewire 890 and one axis corresponding to a distance perpendicular to that position along the guidewire 890 in either direction. For example, the processor circuit may one proximal end of the guidewire as an origin and define determined distances in a distal direction from the origin as units of distance. This measurement may serve as a first coordinate of a two-coordinate pair. A distance perpendicular to the guidewire 890 at any location along the guidewire may serve as the second coordinate of the same two-coordinate pair.

The system may additionally display the bookmarks 872 and 874 or similar bookmarks within the image 1010. As discussed with reference to FIG. 8, these bookmarks may identify locations along the guidewire 890 of interest. For example, a bookmark like bookmarks 872 or 874 may be used to identify a location along the vessel where an occlusion, compression, or lesion was discovered, an image frame with the minimum lumen area (MLA), minimum lumen diameter (MLD) and/or maximal compression, to identify the location of a landing zone for a treatment device, to identify a reference location (e.g., healthy tissue proximal or distal to an occlusion), or any other region. Because these bookmarks were coregistered to locations along the guidewire 890 during the imaging procedure, those same locations may be identified along the guidewire 890 within the image 1010 during a treatment procedure. These bookmarks may also correspond to one or more IVUS images acquired at the same location along the guidewire 890.

The graphical user interface 1000 may also display a device tracking indicator 1050. The device tracking indicator 1050 may indicate whether a device tracking mode is enabled. The device tracking mode may display one or more IVUS images corresponding to the current location of the treatment device during a treatment procedure, as will be described in more detail with reference to FIG. 11. The device tracking indicator 1050 may be of any suitable appearance. For example, it may include any suitable graphical representations such as colors, symbols, images, patterns, shapes, lines, profiles, or alphanumeric text. The indicator 1050 shown in FIG. 10 may indicate to a user that the device tracking mode is not enabled.

Figure 11:
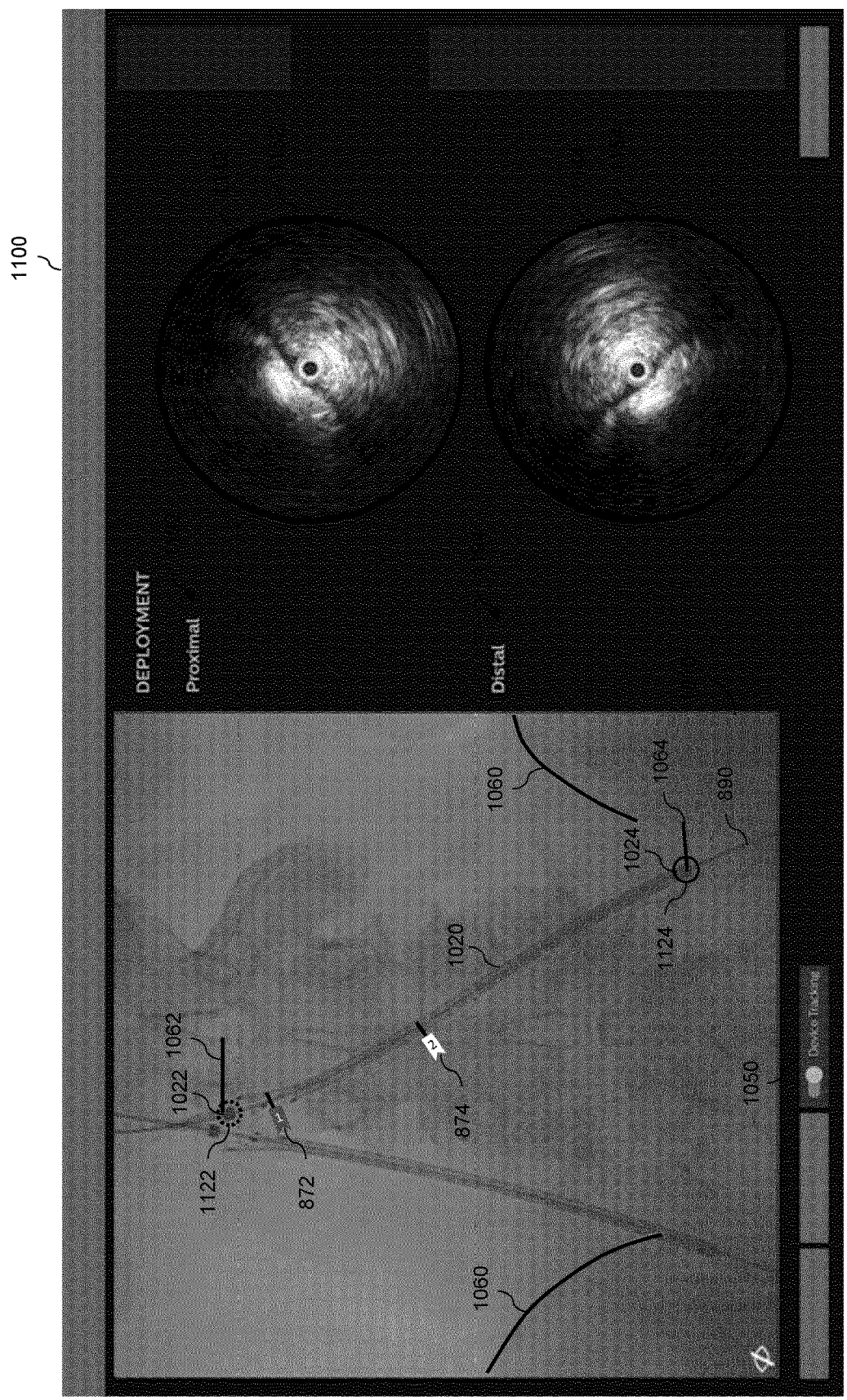
FIG. 11 is a diagrammatic view of a graphical user interface of a treatment procedure displaying a current x-ray image and previously acquired IVUS images, according to aspects of the present disclosure.

FIG. 11 is a diagrammatic view of a graphical user interface 1100 of a treatment procedure displaying a current x-ray image 1010 and previously acquired IVUS images 1142 and 1144, according to aspects of the present disclosure. The graphical user interface 1100 may represent an exemplary display shown when the device tracking mode of the system 100 is enabled, as shown by the indicator 1050. The interface 1100 includes the x-ray image 1010 illustrating markers 1122 and 1124, as well as an IVUS image 1142 and a corresponding border 1152 and an IVUS image 1144 and a corresponding border 1154.

When the device tracking features is enabled, the system 100 may identify the radiopaque markers 1022 and 1024 of the treatment device 1020. For example, the processor circuit can, e.g., automatically track the real time locations of the radiopaque markers 1022 and/or 1024 as the treatment device 1020 moves within the vessel. The markers 1022 and/or 1024 may be radiopaque components provided on the treatment device 1020 for identification purposes during a treatment procedure. The markers 1022 and/or 1024 may be any radiopaque portion of the treatment device 1020. The system may identify the location of the radiopaque markers 1022 and 1024 within the image 1010 by any suitable method. For example, the system 100 may use image processing or artificial intelligence methods, in particular deep learning techniques to identify the location of the radiopaque markers 1022 and 1024. For example, the system 100 may use image processing techniques such as edge detection, blob detection, segmentation, or any other suitable image processing techniques. For example, the system 100 can use a pixel-by-pixel analysis to identify longitudinally adjacent dark pixels along the length of guidewire. Each of the dark pixels can be laterally adjacent to light pixels representative of background tissues.

After the system determines the locations of the radiopaque markers 1022 and 1024, it may identify the nearest location along the guidewire 890 for each of the radiopaque markers. Because the IVUS images acquired during the imaging procedure are coregistered to locations along the guidewire 890, the system may then identify a previously acquired IVUS image corresponding to each of the identified locations. These IVUS images may both be simultaneously displayed to a user as image 1142 and 1144.

The IVUS images 1142 and 1144 may represent the IVUS images of the vessel at the locations of the distal and proximal ends of the treatment device. For example, IVUS image 1144 may be the IVUS image acquired during the imaging procedure at the location along the guidewire where the distal end of the treatment device 1020 is currently positioned. The IVUS image 1142 may be the IVUS image acquired at the location along the guidewire where the proximal end of the treatment device 1020 is currently positioned. In that regard, the IVUS images 1142 and 1144 do not depict the current state of the vessel (e.g., with the treatment device inside). Rather, the IVUS images 1142 and 1144 depict the state of the vessel during the prior imaging phase of the cath lab procedure. By displaying both IVUS images 1142 and 1144 simultaneously, the user of the system 100 may more clearly understand the anatomical structure where the treatment device 1020 is located within the patient. This is advantageous because it provides the physician location-specific intravascular guidance even though no IVUS imaging catheter is positioned within the vessel and the treatment device does not have IVUS imaging. In some embodiments, just as the x-ray image 1010 may be continuously updated, the IVUS images 1142 and 1144 may be continuously updated according to the motion of the treatment device 1020. For example, as the user moves the treatment device along the guidewire, the user may both see the device 1020 move within the x-ray image 1010 and see the IVUS images 1142 and 1144 change to show the IVUS images corresponding to the current locations of the distal and proximal ends of the treatment device 1020. While two IVUS images corresponding to two radiopaque markers of the treatment device 1020 are shown in FIG. 11, it is understood that the interface 1100 can include one or three or more IVUS images and the treatment device can include one or three or more radiopaque portions that are identified/tracked by the processor circuit.

By displaying a continuously updating x-ray image 1010 during a treatment procedure, the user may see the location of the treatment device 1020 from an extraluminal point of view allowing them to position the treatment device 1020 at the predetermined location with respect to other structures or annotations within the image 1010. Additionally, by displaying the IVUS images 1142 and 1144 during the treatment procedure, the user may see cross-sectional radial views of the vessel through which the treatment device is moving at both a distal and proximal end.

The IVUS image 1144 associated with the distal region of the treatment device 1020 may be distinguished from the IVUS image 1142 associated with the proximal region by a number of ways. For example, text 1194 positioned near the IVUS image 1144 may indicate that the image 1144 is associated with the distal region of the device 1020. Similarly, text 1192 may indicate that the image 1142 is associated with the proximal region. However, additional graphical representations may be used as well. For example, a border 1154 may be shown in conjunction with the image 1144. The border 1154 may surround the IVUS image 1144 as shown. It may alternatively be any other suitable graphical representation, such as a symbol, icon, alphanumeric text, or any other visual element. In one embodiment, the border 1154 may be of a particular color and/or pattern to distinguish itself from the IVUS image 1142. In another embodiment, the locations of the IVUS images 1142 and 1144 may distinguish the images 1142 and 1144. For example, the IVUS image 1142 shown in FIG. 11 may be identified as corresponding to the marker 1122 based on the location of the marker 1122 at location along the guidewire 890 proximal to the marker 1124 or at a location above the marker 1124 within the interface 1100. Conversely, the location of the image 1144 may be positioned beneath the image 1142 because the marker 1124 is positioned distal to the marker 1122 or at a location below the marker 1122 within the interface 1100.

The image 1142 may also be shown in conjunction with a border 1152. The border 1152, like the border 1154 may be of any suitable appearance. It may be a symbol, icon, alphanumeric text, or any other visual element. It may be of a different color and/or pattern so as to distinguish itself from the IVUS image 1144 and its border 1154. With the use of graphical representations to convey which of the IVUS images 1144 and 1142 correspond to a distal or proximal end, a user may quickly distinguish the two images during a treatment procedure.

In some embodiments, the x-ray image 1010 may include additional markings corresponding to the locations of IVUS images 1144 and 1142. For example, the image 1010 may include a marking 1122 at a proximal end of the treatment device 1020 and a marking 1124 at a distal end.

In some embodiments, the color and pattern of the marker 1124 may be similar to the color and pattern of the border 1154. In this way, the user may quickly and easily associate the border 1154 and the marking 1124. This may also easily identify to the user the location of the IVUS image 1144 along the guidewire 890 within the x-ray image 1010. In some embodiments, the marker 1124 may also allow the user to verify that the IVUS image 1144 corresponds to the location of the distal radiopaque marker 1024. For example, if an error is made in identifying the location of the distal radiopaque marker 1024, the user may identify the error if the marker 1124 is located in a different position within the image 1010 than the distal radiopaque marker 1024.

Similarly, the color and pattern of the marker 1122 may be similar to the color and pattern of the border 1152 to associate the two. In this way, the user may easily identify the location of the IVUS image 1142 along the guidewire 890. Like the marker 1124, the marker 1122 may also allow the user to verify that the detected location of the proximal radiopaque marker 1022 is accurate.

Figure 12:
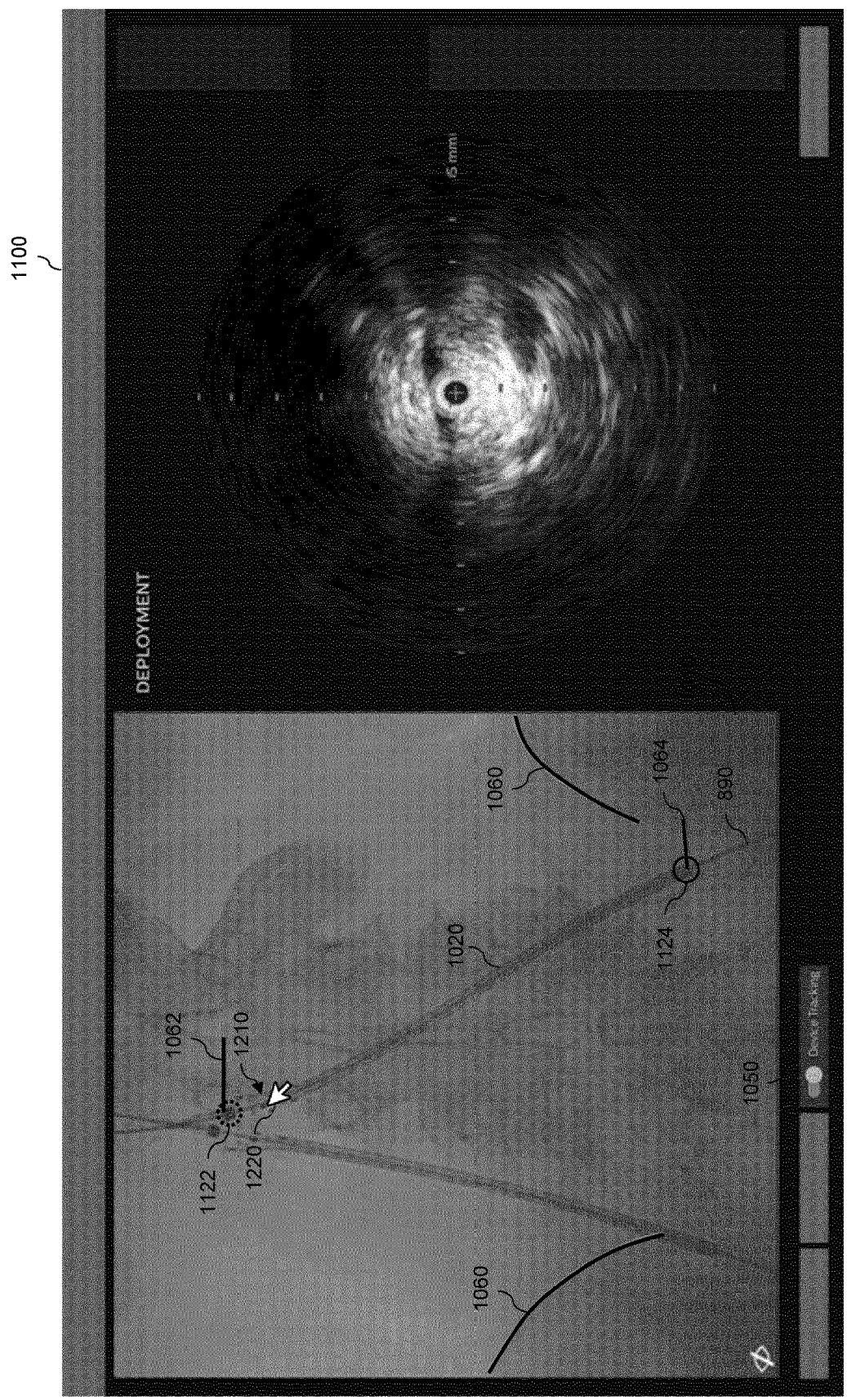
FIG. 12 is a diagrammatic view of a graphical user interface of a treatment procedure displaying a current x-ray image and a previously acquired IVUS image, according to aspects of the present disclosure.

FIG. 12 is a diagrammatic view of a graphical user interface 1100 of a treatment procedure displaying a current x-ray image 1010 and a previously acquired IVUS image 1240, according to aspects of the present disclosure. Upon the direction of the user, the system 100 may display other IVUS images, such as the IVUS image 1240, during a treatment procedure. The x-ray image 1010 shown in FIG. 12 may include a cursor 1220 at a location 1210 along the guidewire 890.

In some embodiments, during a treatment procedure, the user may desire to view other IVUS images different from the IVUS images 1144 and 1142 associated with the distal and proximal ends of the treatment device 1020. To do this, the user may move a cursor 1220 to any location along the guidewire 890 and select the location. In response, the system may display the IVUS image associated with the selected location. For example, as shown in FIG. 12, during a treatment procedure, a user may move the cursor to the location 1210 along the guidewire 890. In response, the system 100 may display an IVUS image 1240 associated with the location 1210 along the guidewire 890.

The IVUS image 1240 may be one image from the IVUS images obtained during the prior imaging procedure. As described with reference to FIG. 10, the IVUS images obtained during the imaging procedure may be coregistered to the x-ray images obtained during the treatment procedures, including the x-ray image 1010 shown in FIG. 12. Because the guidewire 890 is not moved between the imaging procedure and the treatment procedure, the IVUS images obtained during the imaging procedure may be coregistered to the same locations along the guidewire 890 in the x-ray image 1010. Additionally, the processor circuit may identify and display IVUS images from the imaging procedure in response to a user input selecting locations along the treatment device 1020 because the treatment device 1020 moves along the guidewire 890 (e.g., the treatment device is positioned around the guidewire). As a result, each location along the treatment device 1020 corresponds to a location along the guidewire 890.

The selected location 1210 may correspond to a region of interest along the vessel. In some embodiments, it may have been previously identified by a bookmark similar to the bookmarks 872 and/or 874 described with reference to FIG. 8. The location 1210 may also be a region of interest identified by the user during the treatment procedure.

Any suitable input device may be used by the user to select locations along the guidewire 890. For example, the user may select locations along the guidewire 890 or input any other commands to the system 100 via a mouse, a mouse click, cursor, pointer, joystick, physical button, pressure of depressing a physical button, a control pad, finger or touch of the finger on a screen, with a stylus or touch of a stylus on a screen, or by any other means. Whatever the input device, the input device may be positioned proximate to or spaced from the patient. For example, the input device could be a bedside controller coupled to a rail of a bed or table upon which the patient is positioned. The input device may be in a control room separate from the patient and proximate to the procedure room. In addition, any of the user inputs described in the present disclosure may include any of these listed types of inputs.

Figure 13:
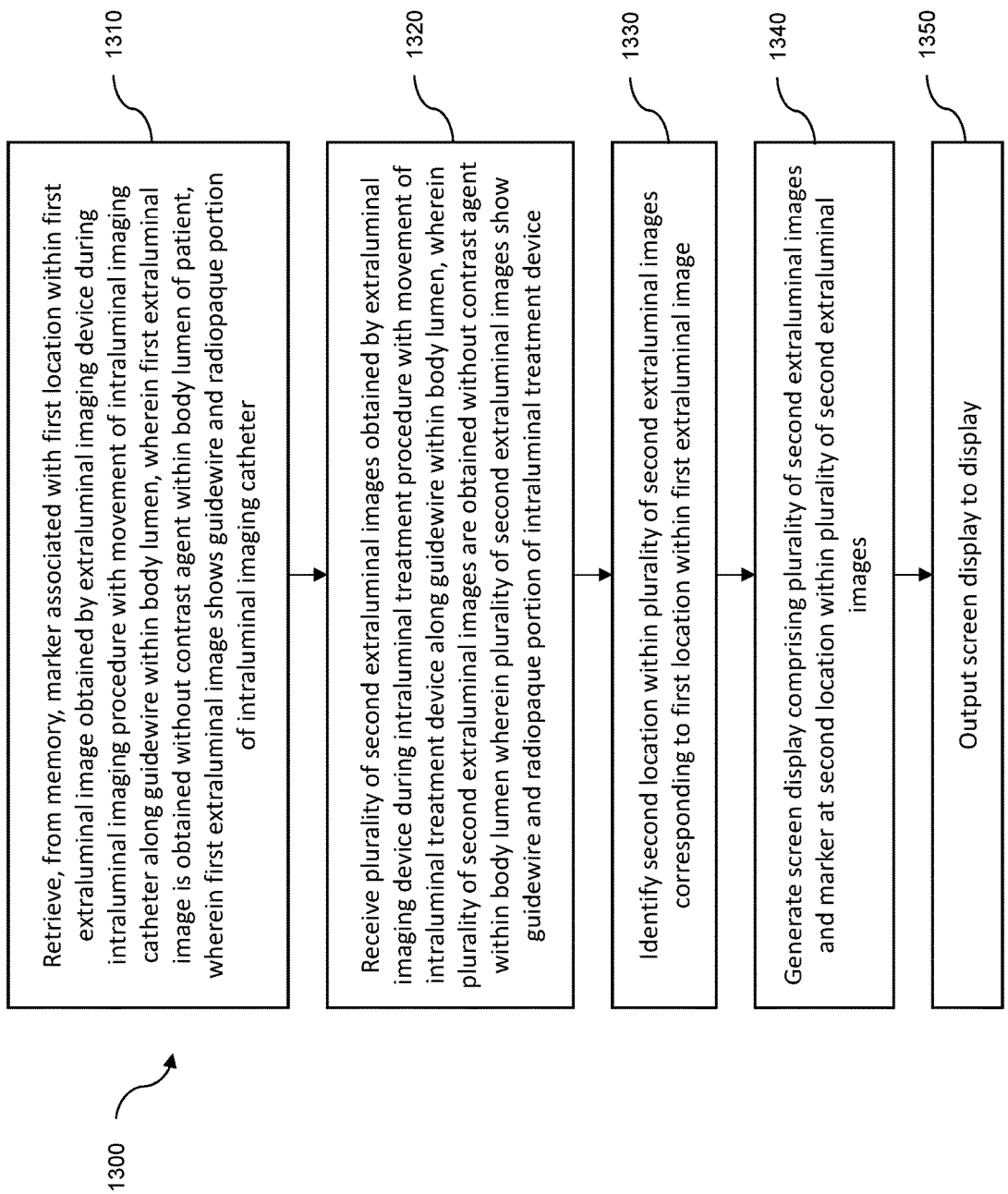
FIG. 13 is a flow diagram for a method for intraluminal treatment guidance based on prior extraluminal imaging, intraluminal data, and coregistration, according to aspects of the present disclosure.

FIG. 13 is a flow diagram for a method 1300 for intraluminal treatment guidance based on prior extraluminal imaging, intraluminal data, and coregistration, according to aspects of the present disclosure. As illustrated, the method 1300 includes a number of enumerated steps, but embodiments of the method 1300 may include additional steps before, after, or in between the enumerated steps. In some embodiments, one or more of the enumerated steps may be omitted, performed in a different order, or performed concurrently. The steps of the method 1300 can be carried out by any suitable component within the system 100 and all steps need not be carried out by the same component. In some embodiments, one or more steps of the methods 1300 can be performed by, or at the direction of, a processor circuit of the system 100 (e.g., the processor circuit 510 of FIG. 5), including, e.g., the processor 560 or any other component.

At step 1310, the method 1300 includes retrieving, from a memory, a marker associated with a first location within a first extraluminal image obtained by the extraluminal imaging device during an intraluminal imaging procedure with movement of an intraluminal imaging catheter along a guidewire within a body lumen. In one example, the first extraluminal image is obtained without a contrast agent within the body lumen of a patient. The first extraluminal image may show the guidewire and a radiopaque portion of the intraluminal imaging catheter. For example, step 1310 can include retrieving, from the memory, a marker associated with a first location within a first x-ray image obtained by the x-ray imaging device during an intravascular ultrasound (IVUS) imaging procedure with movement of an IVUS imaging catheter along a guidewire within a blood vessel of a patient. In some embodiments, the first x-ray image is obtained without contrast agent within the blood vessel. The first x-ray image may show the guidewire and a radiopaque portion of the IVUS imaging catheter. In some embodiments, the marker is representative of at least one of a bookmarked IVUS image, a treatment region, or an anatomical feature.

At step 1320, the method 1300 includes receiving a plurality of second extraluminal images obtained by the extraluminal imaging device during an intraluminal treatment procedure with movement of an intraluminal treatment device along the guidewire within the body lumen. In some embodiments, the plurality of second extraluminal images are obtained without the contrast agent within the body lumen. The plurality of second extraluminal images may show the guidewire and a radiopaque portion of the intraluminal treatment device. For example, step 1320 can include receiving a plurality of second x-ray images obtained by the x-ray imaging device during an intravascular treatment procedure with movement of an intravascular treatment device along the guidewire within the blood vessel. In some embodiments, the plurality of second x-ray images are obtained without the contrast agent within the blood vessel. The plurality of second x-ray images may show the guidewire and a radiopaque portion of the intravascular treatment device. In some embodiments, the patient, the guidewire, and the x-ray imaging device are in a same arrangement in IVUS imaging procedure and the intravascular treatment procedure.

At step 1330, the method 1300 includes identifying a second location within the plurality of second extraluminal images corresponding to the first location within the first extraluminal image. For example, step 1330 can include identifying a second location within the plurality of second x-ray images corresponding to the first location within the first x-ray image such that the first location and the second location are representative of a same location of the patient.

At step 1340, the method 1300 includes generating a screen display comprising the plurality of second extraluminal images and the marker at the second location within the plurality of second extraluminal images. For example, step 1340 can include generating a screen display comprising the plurality of second x-ray images and the marker at the second location within the plurality of second x-ray images.

At step 1350, the method 1300 includes outputting the screen display to the display.

FIG. 14 is a flow diagram for a method 1400 for intraluminal treatment guidance based on prior extraluminal imaging, intraluminal data, and coregistration, according to aspects of the present disclosure. As illustrated, the method 1400 includes a number of enumerated steps, but embodiments of the method 1400 may include additional steps before, after, or in between the enumerated steps. In some embodiments, one or more of the enumerated steps may be omitted, performed in a different order, or performed concurrently. The steps of the method 1400 can be carried out by any suitable component within the system 100 and all steps need not be carried out by the same component. In some embodiments, one or more steps of the methods 1400 can be performed by, or at the direction of, a processor circuit of the system 100 (e.g., the processor circuit 510 of FIG. 5), including, e.g., the processor 560 or any other component.

At step 1410, the method 1400 includes receiving a plurality of first extraluminal images obtained by the extraluminal imaging device during an intraluminal treatment procedure with movement of an intraluminal treatment device along a guidewire within a body lumen of a patient. In some embodiments, the plurality of first extraluminal images are obtained without the contrast agent within the body lumen. The plurality of first extraluminal images may show the guidewire and a radiopaque portion of the intraluminal treatment device. For example, step 1410 can include receiving a plurality of first x-ray images obtained by the x-ray imaging device during an intravascular treatment procedure with movement of an intravascular treatment device along a guidewire within a blood vessel of a patient. In some embodiments, the plurality of first x-ray images are obtained without the contrast agent within the body lumen. The plurality of first x-ray images may show the guidewire and a radiopaque portion of the intravascular treatment device.

At step 1420, the method 1400 includes identifying a first location along the guidewire within at least one of the plurality of first extraluminal images. For example, the step 1420 can include identifying one or more first locations along the guidewire within at least one of the plurality of first x-ray images. In some embodiments, the one or more first locations are associated with one or more radiopaque markers of the intravascular treatment device and/or a user-selected location.

At step 1430, the method 1400 includes identifying a second location along the guidewire within a second extraluminal image corresponding to the first location along the guidewire within at least one of the plurality of first extraluminal images such that the first location and the second location are representative of a same location of the patient. In some embodiments, the second extraluminal image is obtained by the extraluminal imaging device during an intraluminal imaging procedure with movement of an intraluminal imaging catheter along the guidewire within the body lumen. The second extraluminal image may be obtained without contrast agent within the body lumen. The second extraluminal image may show the guidewire and a radiopaque portion of the intraluminal imaging catheter. For example, the step 1430 can include identifying one or more second locations along the guidewire within a second x-ray image corresponding to the one or more first locations along the guidewire within at least one of the plurality of first x-ray images such that the one or more first locations and the one or more second locations are representative of one or more same locations of the patient. In some embodiments, the second x-ray image is obtained by the x-ray imaging device during an intravascular ultrasound (IVUS) imaging procedure with movement of an IVUS imaging catheter along the guidewire within the body lumen. The second x-ray image may be obtained without contrast agent within the body lumen. The second x-ray image may show the guidewire and a radiopaque portion of the IVUS imaging catheter.

At step 1440, the method 1400 includes retrieving, from the memory, an intraluminal image obtained during the movement of the intraluminal imaging catheter by the intraluminal imaging catheter and co-registered with the second location along the guidewire within the second extraluminal image. For example, the step 1440 can include retrieving, from the memory, one or more IVUS images obtained during the movement of the by IVUS imaging catheter and co-registered with the one or more second locations along the guidewire within the second x-ray image.

At step 1450, the method 1400 includes generating a screen display comprising at least one of the plurality of first extraluminal images and the intraluminal image. For example, the step 1450 can include generating a screen display comprising at least one of the plurality of first x-ray images and the one or more IVUS images.

At step 1460, the method 1400 includes outputting the screen display to the display.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A system, comprising:
a processor configured for communication with an extraluminal imaging device, a memory, and a display, wherein the processor is configured to:
retrieve, from the memory, a marker associated with a first location within a first extraluminal image obtained by the extraluminal imaging device during an intraluminal imaging procedure with movement of an intraluminal imaging catheter along a guidewire within a body lumen, wherein the first extraluminal image is obtained without contrast agent within the body lumen of a patient, wherein the first extraluminal image shows the guidewire and a radiopaque portion of the intraluminal imaging catheter;
receive a plurality of second extraluminal images obtained by the extraluminal imaging device during an intraluminal treatment procedure with movement of an intraluminal treatment device along the guidewire within the body lumen, wherein the plurality of second extraluminal images are obtained without the contrast agent within the body lumen, wherein the plurality of second extraluminal images show the guidewire and a radiopaque portion of the intraluminal treatment device;
identify a second location within the plurality of second extraluminal images corresponding to the first location within the first extraluminal image;
generate a screen display comprising:
the plurality of second extraluminal images; and
the marker at the second location within the plurality of second extraluminal images; and
output the screen display to the display.

2. The system of claim 1, wherein the marker is representative of at least one of a bookmarked IVUS image, a treatment region, or an anatomical feature.

3. The system of claim 1, wherein the marker is user-generated.

4. The system of claim 3, wherein the marker is a shape drawn by a user.

5. The system of claim 1, wherein the marker is automatically generated by the processor circuit.

6. The system of claim 1, wherein the patient, the guidewire, and the x-ray imaging device are in a same arrangement in the intraluminal imaging procedure and the intravascular treatment procedure.

7. The system of claim 1, wherein the first location and the second location are representative of a same location of the patient.

8. A system, comprising:
a processor configured for communication with an x-ray imaging device, a memory, and a display, wherein the processor is configured to:
retrieve, from the memory, a marker associated with a first location within a first x-ray image obtained by the x-ray imaging device during an intravascular ultrasound (IVUS) imaging procedure with movement of an IVUS imaging catheter along a guidewire within a blood vessel of a patient, wherein the first x-ray image is obtained without contrast agent within the blood vessel, wherein the first x-ray image shows the guidewire and a radiopaque portion of the IVUS imaging catheter, wherein the marker is representative of at least one of a bookmarked IVUS image, a treatment region, or an anatomical feature;
receive a plurality of second x-ray images obtained by the x-ray imaging device during an intravascular treatment procedure with movement of an intravascular treatment device along the guidewire within the blood vessel, wherein the plurality of second x-ray images are obtained without the contrast agent within the blood vessel, wherein the plurality of second x-ray images show the guidewire and a radiopaque portion of the intravascular treatment device, wherein the patient, the guidewire, and the x-ray imaging device are in a same arrangement in IVUS imaging procedure and the intravascular treatment procedure;

identify a second location within the plurality of second x-ray images corresponding to the first location within the first x-ray image such that the first location and the second location are representative of a same location of the patient;

generate a screen display comprising:
  the plurality of second x-ray images; and
  the marker at the second location within the plurality of second x-ray images; and
output the screen display to the display.

9. A system, comprising:
a processor configured for communication with an extraluminal imaging device, a memory, and a display, wherein the processor is configured to:
  receive a plurality of first extraluminal images obtained by the extraluminal imaging device during an intraluminal treatment procedure with movement of an intraluminal treatment device along a guidewire within a body lumen of a patient, wherein the plurality of first extraluminal images are obtained without the contrast agent within the body lumen, wherein the plurality of first extraluminal images show the guidewire and a radiopaque portion of the intraluminal treatment device;
  identify a first location along the guidewire within at least one of the plurality of first extraluminal images;
  identify a second location along the guidewire within a second extraluminal image corresponding to the first location along the guidewire within at least one of the plurality of first extraluminal images such that the first location and the second location are representative of a same location of the patient, wherein the second extraluminal image is obtained by the extraluminal imaging device during an intraluminal imaging procedure with movement of an intraluminal imaging catheter along the guidewire within the body lumen, wherein the second extraluminal image is obtained without contrast agent within the body lumen, wherein the second extraluminal image shows the guidewire and a radiopaque portion of the intraluminal imaging catheter;
  retrieve, from the memory, an intraluminal image obtained during the movement of the intraluminal imaging catheter and co-registered with the second location along the guidewire within the second extraluminal image;
  generate a screen display comprising:
    at least one of the plurality of first extraluminal images; and
    the intraluminal image; and
  output the screen display to the display.

10. The system of claim 9, wherein, to identify the first location along the guidewire, the processor is configured to identify a radiopaque marker of the intraluminal treatment device.

11. The system of claim 10, wherein the processor is configured to:
  identify a further radiopaque marker of the intraluminal treatment device at a further first location along the guidewire in at least one of the plurality of first extraluminal images, wherein the radiopaque marker and the further radiopaque marker are respectively disposed at a proximal portion and a distal portion of the intraluminal treatment device.

12. The system of claim 11, wherein the processor is configured to:
  identify a further second location along the guidewire within the second x-ray image corresponding to the further first location along the guidewire within at least one of the plurality of first extraluminal images such that the further first location and the further second location are representative of a same location of the patient; and
  retrieve, from the memory, a further intraluminal image obtained during the movement of the intraluminal imaging catheter and co-registered with the further second location along the guidewire within the second extraluminal image,
  wherein the screen display comprises the further intraluminal image simultaneously displayed with the intraluminal image and the at least one of the plurality of first extraluminal images.

13. The system of claim 10, wherein the processor is configured to:
  automatically track the radiopaque marker within the plurality of first extraluminal images;
  identify a different location along the guidewire for the radiopaque marker in at least one of the plurality of first extraluminal images;
  identify a further location along the guidewire within the second x-ray image corresponding to the different location along the guidewire within at least one of the plurality of first extraluminal images such that the different location and the further location are representative of the same location of the patient;
  retrieve, from the memory, a further intraluminal image obtained during the movement of the intraluminal imaging catheter and co-registered with the further location along the guidewire within the second extraluminal image; and
  modify the screen display to remove the intraluminal image and add the further intraluminal image.

14. The system of claim 9, wherein, to identify the first location along the guidewire, the processor is configured to receive a user input selecting the first location.

15. A system, comprising:
a processor configured for communication with an x-ray imaging device, a memory, and a display, wherein the processor is configured to:
  receive a plurality of first x-ray images obtained by the x-ray imaging device during an intravascular treatment procedure with movement of an intravascular treatment device along a guidewire within a blood vessel of a patient, wherein the plurality of first x-ray images are obtained without the contrast agent within the body lumen, wherein the plurality of first x-ray images show the guidewire and a radiopaque portion of the intravascular treatment device;
  identify one or more first locations along the guidewire within at least one of the plurality of first x-ray images, wherein the one or more first locations are associated with one or more radiopaque markers of the intravascular treatment device and/or a user-selected location;

identify one or more second locations along the guidewire within a second x-ray image corresponding to the one or more first locations along the guidewire within at least one of the plurality of first x-ray images such that the one or more first locations and the one or more second locations are representative of one or more same locations of the patient, wherein the second x-ray image is obtained by the x-ray imaging device during an intravascular ultrasound (IVUS) imaging procedure with movement of an IVUS imaging catheter along the guidewire within the body lumen, wherein the second x-ray image is obtained without contrast agent within the body lumen, wherein the second x-ray image shows the guidewire and a radiopaque portion of the IVUS imaging catheter;

retrieve, from the memory, one or more IVUS images obtained during the movement of the by IVUS imaging catheter and co-registered with the one or more second locations along the guidewire within the second x-ray image;

generate a screen display comprising:
   at least one of the plurality of first x-ray images; and
   the one or more IVUS images; and output the screen display to the display.

\* \* \* \* \*